United States Patent
Chen et al.

(10) Patent No.: US 7,492,783 B2
(45) Date of Patent: Feb. 17, 2009

(54) METHOD AND SYSTEM FOR LIPF7 ORIGINATION DETECTION AND LIPF8 SUPPRESSION IN A PORT BYPASS CONTROLLER

(75) Inventors: Chung-Jue Chen, Irvine, CA (US); Ali Ghiasi, Cupertino, CA (US); Jay Proano, Rancho Santa Margarita, CA (US); Rajesh Satapathy, Lake Forest, CA (US); Steve Thomas, Riverside, CA (US)

(73) Assignee: Broadcom Corporation, Irvine, CA (US)

( * ) Notice: Subject to any disclaimer, the term of this patent is extended or adjusted under 35 U.S.C. 154(b) by 960 days.

(21) Appl. No.: 10/779,233

(22) Filed: Feb. 13, 2004

(65) Prior Publication Data

US 2005/0129057 A1  Jun. 16, 2005

Related U.S. Application Data

(60) Provisional application No. 60/529,421, filed on Dec. 12, 2003, provisional application No. 60/529,200, filed on Dec. 12, 2003, provisional application No. 60/529,145, filed on Dec. 12, 2003, provisional application No. 60/529,143, filed on Dec. 12, 2003.

(51) Int. Cl.
*H04B 7/212* (2006.01)
(52) U.S. Cl. .................. 370/424; 370/230; 370/503
(58) Field of Classification Search .............. 370/230, 370/424, 503
See application file for complete search history.

(56) References Cited

U.S. PATENT DOCUMENTS

| 6,101,166 A * | 8/2000 | Baldwin et al. ............ 370/222 |
| 6,430,714 B1 * | 8/2002 | McAdam et al. ........... 714/704 |
| 6,847,335 B1 * | 1/2005 | Chang et al. ............... 345/3.1 |
| 2004/0081186 A1 * | 4/2004 | Warren et al. .............. 370/419 |

* cited by examiner

*Primary Examiner*—Firmin Backer
*Assistant Examiner*—Jason Mattis
(74) *Attorney, Agent, or Firm*—McAndrews, Held & Malloy, Ltd.

(57) ABSTRACT

Certain embodiments of the invention may be found in a method and system for operating ports in port bypass controllers through LIPf7 origination detection and LIPf8 suppression, which may be utilized, for example, in storage systems. Aspects of the method may comprise receiving a data stream at a receive port Rx(n) of a port bypass controller, where n is an integer indexing a port in the port bypass controller. LIPf8 primitives in the received data stream may be suppressed at the receive port Rx(n) and LIPf7 primitives inserted in place of at least a portion of the suppressed LIPf8 primitives.

24 Claims, 19 Drawing Sheets

METHOD AND SYSTEM FOR LIPF7 ORIGINATION DETECTION AND LIPF8 SUPPRESSION IN A PORT BYPASS CONTROLLER

CROSS-REFERENCE TO RELATED APPLICATIONS/INCORPORATION BY REFERENCE

This application makes reference to, claims priority to, and claims the benefit of:
U.S. Provisional Application Ser. No. 60/529,421 filed Dec. 12, 2003;
U.S. Provisional Application Ser. No. 60/529,200 filed Dec. 12, 2003;
U.S. Provisional Application Ser. No. 60/529,145 filed Dec. 12, 2003; and
U.S. Provisional Application Ser. No. 60/529,143 filed Dec. 12, 2003.

This application also makes reference to:
U.S. application Ser. No. 10/779,234 filed Feb. 13, 2004;
U.S. application Ser. No. 10/779,001 filed Feb. 13, 2004;
U.S. application Ser. No. 10/779,232 filed Feb. 13, 2004;
U.S. application Ser. No. 10/767,729 filed Jan. 30, 2004; and
U.S. application Ser. No. 10/767,748 filed Jan. 30, 2004.

The above stated applications are hereby incorporated herein by reference in their entirety.

FIELD OF THE INVENTION

Certain embodiments of the invention relate to port bypass controllers. More specifically, certain embodiments of the invention relate to a method and system for operating ports in port bypass controllers through LIPf7 origination detection and LIPf8 suppression.

BACKGROUND OF THE INVENTION

FIG. 1a is a block diagram 120 of a conventional networking environment illustrating the arrangements of various communication and storage entities. Referring to FIG. 1a, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126, 128 and data storage elements 114, 118, 122, 124 and 130.

The data storage element 114 may be coupled to the PC 112, the data storage element 118 may be coupled to the PC 116 and the data storage element 122 may be coupled to the PC 120. The data storage element 124 may be coupled to the server 126 and the data storage element 130 may be coupled to the server 128. The LANs 104, 106, 108 may also comprise a plurality of PCs, data storage elements and servers which may be configured in a somewhat similar manner as in LAN 102.

In operation, the PCs 112, 116, 120 may communicate with each other and with the servers 126, 128 via the LAN 102. The PCs 112, 116, 120 may communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 114, 118, 122, 124, 130 via the router 132.

A major drawback with the configuration of the conventional networking environment of FIG. 1a is that the bandwidth of the PC's connection or link to the LAN and the server's connection or link to the LAN may severely affect the performance of a communication network. Furthermore, the processing bandwidth of the PC's and the servers may further decrease system performance by introducing delays, which results in increased system latency. For example, it may be desirable for PC 112 to communicate with PC 120 in order to acquire information from the data storage element 122. Accordingly, if the network connections coupling the PC 112 and the PC 120 are slow, then these connections will limit communication between PC 112 and PC 120. Performance of the communication between PC 112 and PC 120 may be further limited or degraded in cases where the processing bandwidth for the PC 112 and PC 120 are low. Furthermore, during operation, multiple PCs may be attempting to communicate with the PC 120 in order to acquire information from the data storage element 120 while the PC 112 is simultaneously communicating with the PC 120. In this regard, as the number of communication entities attempting to acquire information from the data storage element 122 increases, the limited processing bandwidth and communication bandwidth of the PC 112 and the PC 120 may result in further delays and increased latency. The PCs 112, 116, 120, therefore, become bottlenecks.

In another example, it may be desirable for PC 120 to communicate with server 126 in order to acquire information from the data storage element 124. Accordingly, if the network connections coupling the PC 120 and the server 126 are slow, then these connections will limit communication between PC 120 and server 126. Performance of the communication between PC 120 and server 126 may be further limited or degraded in cases where the processing bandwidth for the PC 120 and server 126 are low. Furthermore, during operation, multiple PCs such as PCs 112, 116 may be attempting to communicate with the server 126 in order to acquire information from the data storage element 124, while the PC 120 is simultaneously communicating with the server 126. In this regard, as the number of communication entities attempting to acquire information from the data storage element 124 via the server 126 increases, the limited processing bandwidth and communication bandwidth of the PC 120 and the server 126 may result in further delays and increased latency. Although the bandwidth of the connections of the PCs and servers to the LAN may be increased by adding higher bandwidth connections, this can be a costly venture. Similarly, the processing bandwidth may also be increased by adding faster processors but the cost may be prohibitive.

FIG. 1b is a block diagram 130 of an improved conventional networking environment illustrating the arrangements of various communication and storage entities, which addresses some of the drawbacks of the networking environment of FIG. 1a. Referring to FIG. 1b, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126, 128 and data storage elements 132 and 134.

The data storage element 134 may comprise a plurality of storage devices such as a disk array, which may be coupled to the server 126. The data storage element 136 may also comprise a plurality of storage devices such as a disk array, which may be coupled to the server 128. The LANs 104, 106, 108 may also comprise a plurality of PCs, data storage elements and servers which may be configured in a somewhat similar manner as in LAN 102.

During operation, the PCs 112, 116, 120 may communicate with each other and with the servers 126, 128 via the LAN 102. The PCs 112, 116, 120 may also communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 134, 136.

When compared to the networking environment of FIG. 1a, the servers 126, 128 may be configured so that they have much greater communication and processing bandwidth that the PCs 112, 116, 120. Notwithstanding, although the networking environment configuration of FIG. 1b may provide better performance than the networking environment of FIG. 1a, one drawback with the configuration of FIG. 1b is that the servers 126, 128 are now bottlenecks. In this regard, as the number of connections to the servers requesting information from the data storage entities 134, 136 increases, the servers themselves will become bottlenecks resulting is degradation of system performance. For example, in instances when the PCs 112, 116, 120 and other networking communication entities coupled to the LANs 104, 106, 108 simultaneously acquire information from the servers 126 and/or 128, some connections may be blocked since the servers 126 may not have the capacity to handle all the connections.

FIG. 1c is a block diagram 140 of an improved conventional networking environment illustrating the arrangements of various communication and storage entities, which addresses some of the drawbacks of the networking environment of FIG. 1a and FIG. 1b. Referring to FIG. 1c, there is shown a wide area network (WAN) 110 comprising a plurality of local area networks (LANs) 102, 104, 106, 108, a router 132 and a storage area network (SAN) 142. The LANs 102, 104, 106, 108 are coupled via the router 132. The LAN 102 comprises PCs 112, 116, 120 and servers 126, 128. The storage area network 142 comprises data storage elements 144, 146 and 148.

The data storage elements 144, 146, 148 may comprise a plurality of storage devices such as disk arrays, which may be coupled to the servers 126, 128 via the storage access network 142. Each of the LANs 104, 106, 108 may also comprise a plurality of PCs and servers which may be configured in a somewhat similar manner as in LAN 102. One or more servers coupled to the LANs 104, 106, 108 may also be coupled to the storage area network 142 or may communicate with data storage elements 144, 146, 148 via the storage area network 148. Since any of the LANs 102, 104, 106, 108 may communicate directly or indirectly with the storage area network 142, information stored in the data storage elements 144, 146, 148 may be more readily accessible without encountering the bottlenecks previously associated with the networking environments of FIG. 1a and FIG. 1b.

FIG. 2 is a block diagram of an exemplary local area network (LAN) coupled to a storage area network (SAN). Referring to FIG. 2, there is shown LANs 202, 204, 206, 208 and storage access network (SAN) 240. The LAN 202 may comprise PCs 210, 212, 214, and servers 216, 218. The storage area network 240 may comprise a fibre channel (FC) switch 224, file servers (FSs) 226, 228, 230 and a plurality of data storage elements 232, 234, 236. Each of the data storage elements 232, 234, 236 may comprise a plurality of fibre channel hard disks.

The storage access network 240 may be coupled to the LAN 202 via host bus adapters (HBAS) 220, 222, which interfaces with the servers. In this regard, the host bus adapter 220 may be configured to interface with the fibre channel switch 224 and the server 216, and the host bus adapter 222 may be configured to interface with the fibre channel switch 224 and the server 218. The file server 226 may be coupled to the data storage element 232, the file server 228 may be coupled to the data storage element 234 and the file server 230 may be coupled to the data storage element 236.

The file servers 216, 218 may comprise a plurality of ports to which a data storage device such as a hard disk may be coupled. Each of the file server's plurality of ports may be electrically and/or optically coupled to a single storage element such as a hard disk. In this regard, each of the file servers 226, 228, 230 supports a single point-to-point connection with a particular hard disk.

The fibre channel switch 224 may be adapted to switch connections between servers and the file servers. For example, the fibre channel switch 224 may be adapted to switch connections from the server 216 to any of the file servers 226, 228, 230 in order to provide access to the data storage elements 232, 234, 236 respectively. Similarly, the fibre channel switch 224 may be adapted to switch connections from the server 216 to any of the file servers 226, 228, 230 in order to provide access to any one or more of the data storage elements 232, 234, 236 respectively.

In operation, PC 214 may utilize any of the servers 216, 218 to retrieve information from any of the file servers 232, 234, 236. In a case where PC 214 establishes a connection with server 216 in order to retrieve information from the file server 236, then the fibre channel switch 224 may switch the connection from the server 216 to the file server 236. In another example, a communication device coupled to LAN 204 may establish a connection with server 218 in order to retrieve information from the file server 234. The fibre channel switch 224 may switch the connection from the server 218 to the file server 234.

Although the networking environment of FIG. 2 provides significantly increased performance over the conventional networking environments illustrated in FIG. 1a, FIG. 1b and FIG. 1c, a major drawback with the networking environment of FIG. 2 is its point-to-point communication link existing between each of the hard disks and each of the plurality of file server ports. In particular, the point-to-point communication links existing between each of the hard disks and the file server ports can be quite expensive to operate and/or maintain.

Since data availability is the lifeline of every business, data loss is not only intolerable but its loss may interrupt daily operation and cause significant loss of revenue. In order to improve data availability, components with higher MTBF are required and systems are generally subjected to and are required pass a rigorous suite or battery of tests. In order to prevent data loss, storage systems which utilize, for example, fibre channel (FC) drives, are designed with a dual loop architecture which is adapted to facilitate data access through the second loop which may be utilized to provide redundancy.

FIG. 3 is a block diagram of a conventional fibre channel arbitrated loop arrangement which may be utilized for coupling a plurality of hard disks which may be found in the data storage entities of FIG. 1a, FIG. 1b, FIG. 1c and FIG. 2. Referring to FIG. 3, there is shown a server 302, a host bus adapter 304, and a plurality of hard disks, namely, 306a, 306b, 306c, 306d, 306e, 306f, 306g, 306h, 306i, 306j and 306k. Each of the hard disks 306a, . . . , 306k may comprise a port bypass controller and repeater (PBC/R) block. Each of the port bypass controller and repeater blocks may comprise a dual port architecture for redundancy.

The host bus adapter 304 interfaces with the server 302 and couples the hard disks to the server 302. The hard disks 306a, . . . , 306k are arranged in a loop or ring configuration with the first hard disk 306a in the ring coupled to the host bus adapter 304. The second hard disk 306b is coupled to the first hard disk 306b and the third hard disk 306c is coupled to the second hard disk 306b. The remaining hard disks are coupled or chained in a similar arrangement with the last hard disk 306k in the chain or loop being coupled to the host bus adapter 304. The last hard disk 306k is also chained to hard disk 306j. The fibre channel arbitrated loop (FC-AL) arrangement is a ring arrangement that is somewhat similar in arrangement to a token ring configuration, but only with regard to their configuration. With regard to its operation, the fibre channel arbitrated loop does not utilize a token for facilitating communication between nodes on the loop. Rather, the fibre channel arbitrated loop utilizes an arbitrated loop address to facilitate communication between the nodes that are coupled to the loop.

Each of the hard disks that are on the fibre channel arbitrated loop, which may also be referred to as a ring, share the bandwidth allocated for the loop. Communication over the loop occurs on a point-to-point basis between an initiating hard disk and a destination hard disk. At any particular instant during which communication occurs over the loop, only two (2) ports, may be active at the same time. The two ports that are active include the port that won loop arbitration and the port that is in communication that won the arbitration. The port that has won the arbitration may be referred to as the initiating port and the port in communication with the port that won the arbitration may be referred to as the destination port. Traffic does not have to be routed between the initiating port and destination port since there is point-to-point communication between the initiating port and the destination port. During communication, ports other than the initiating port and the destination port in the loop are adapted to receive frames and forward the received frames to successive ports in the loop. The received frames may be data frames and control frames such as acknowledgements and ready frames. A major drawback with this type of receive and forward scheme is the increased latency penalty introduced and incurred by each successive port in the loop.

Some fibre channel arbitrated loop implementations such as the implementation illustrated in FIG. 3 were based on analog port bypass controller (PBC) and repeaters (R). The combination of loop architecture with the port bypass controller were prone to problems which often resulted in catastrophic loop failures since one hard disk could potentially affect the operation of all the other hard disks in the loop. These port bypass controller implementations required operators or service technicians to insert and/or remove each hard disk individually in order to determine and/or isolate the actual location of a loop failure or failed hard disk. Furthermore, an overwhelming majority of these failures were signal integrity related.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for operating ports in port bypass controllers through LIPf7 origination detection and LIPf8 suppression. Aspects of the method may comprise receiving a data stream at a receive port Rx(n) of a port bypass controller, where n is an integer indexing a port in the port bypass controller. LIPf8 primitives in the received data stream may be suppressed at the receive port Rx(n) and LIPf7 primitives inserted in place of at least a portion of the suppressed LIPf8 primitives.

If at least three (3) consecutive LIPf8 primitives are received at the receive port Rx(n), an operating mode of the port Rx(n) may be determined. If the operating mode of the port Rx(n) is a reference clock switches first mode, a plurality of IDLES may be inserted in the received data stream. A plurality of ARBff primitives may be inserted after the plurality of IDLES. A reference clock for port Tx(n+1) may be switched and at least one LIPf7 primitive may be inserted into the port Tx(n+1) if the operating mode of the port Rx(n) is a reference clock switches first mode. Accordingly, port Rx(n−1) of the PBC may be coupled to port Tx(n+1) and port Rx(n) may be coupled to port Tx(n) of the port bypass controller.

If the operating mode of the port Rx(n) is a reference clock switches later mode, consecutive LIPf7 primitives may be inserted into port Tx(n+1) of the port bypass controller. If at least three (3) consecutive LIPf8 primitives are received in port Rx(n), a reference clock for port Tx(n+1) may be switched. Accordingly, port Rx(n−1) of the PBC may be coupled to port Tx(n+1) and port Rx(n) may be coupled to port Tx(n) of the port bypass controller.

Another embodiment of the invention may provide a machine-readable storage, having stored thereon, a computer program having at least one code section executable by a machine, thereby causing the machine to perform the steps as described above for operating ports in port bypass controllers through LIPf7 origination detection and LIPf8 suppression.

Aspects of the method may comprise a receive port Rx(n) of a port bypass controller that receives a data stream, where n is an integer indexing a port in the port bypass controller. At least one processor may be adapted to suppress LIPf8 primitives in the received data stream at the receive port Rx(n) and insert LIPf7 primitives in place of at least a portion of the suppressed LIPf8 primitives the receive port Rx(n). The processor may be a host system processor or a controller.

If at least three (3) consecutive LIPf8 primitives are received at the receive port Rx(n), the processor may determine an operating mode of the port Rx(n) of the port bypass controller. If the operating mode of the port Rx(n) is a reference clock switches first mode, a plurality of IDLES may be inserted in the received data stream. A plurality of ARBff primitives may be inserted after the plurality of IDLES. The processor may switch a reference clock for port Tx(n+1) and at least one LIPf7 primitive may be inserted into the port Tx(n+1) by the processor if the operating mode of the port Rx(n) is a reference clock switches first mode. Accordingly, the processor may couple port Rx(n−1) of the PBC to port Tx(n+1) and couple port Rx(n) to port Tx(n) of the port bypass controller.

If the operating mode of the port Rx(n) is a reference clock switches later mode, the processor may insert consecutive LIPf7 primitives into port Tx(n+1) of the port bypass controller. If at least three (3) consecutive LIPf8 primitives are received in port Rx(n), a reference clock for port Tx(n+1) may be switched by the processor. Accordingly, the processor may couple port Rx(n−1) of the PBC to port Tx(n+1), and couple port Rx(n) to port Tx(n) of the port bypass controller.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1b is a block diagram of an improved conventional networking environment illustrating the arrangements of various communication and storage entities, which addresses some of the drawbacks of the networking environment of FIG. 1a.

DETAILED DESCRIPTION OF THE INVENTION

Figure 1A:
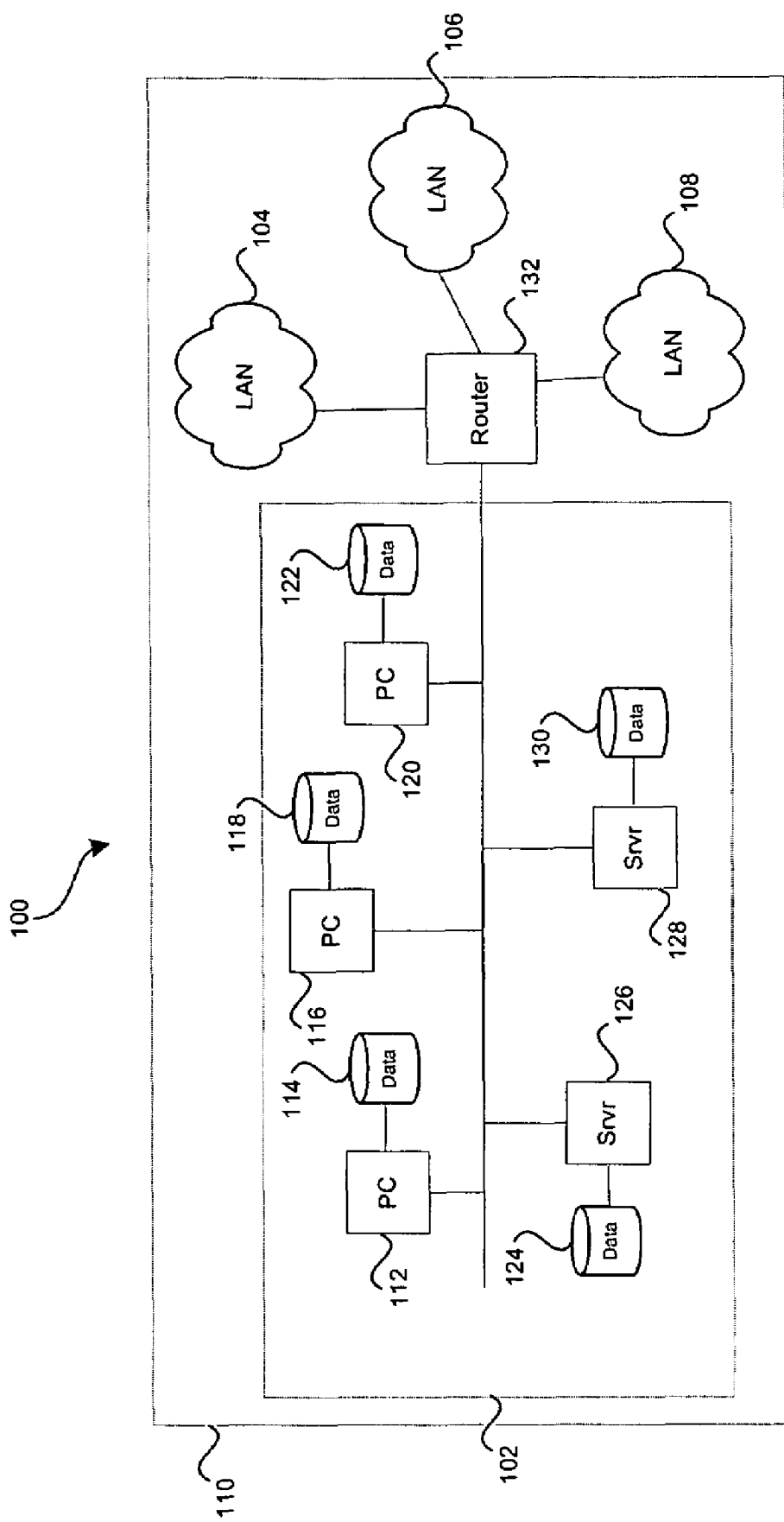
FIG. 1a is a block diagram of a conventional networking environment illustrating the arrangements of various communication and storage entities.
Figure 1B:
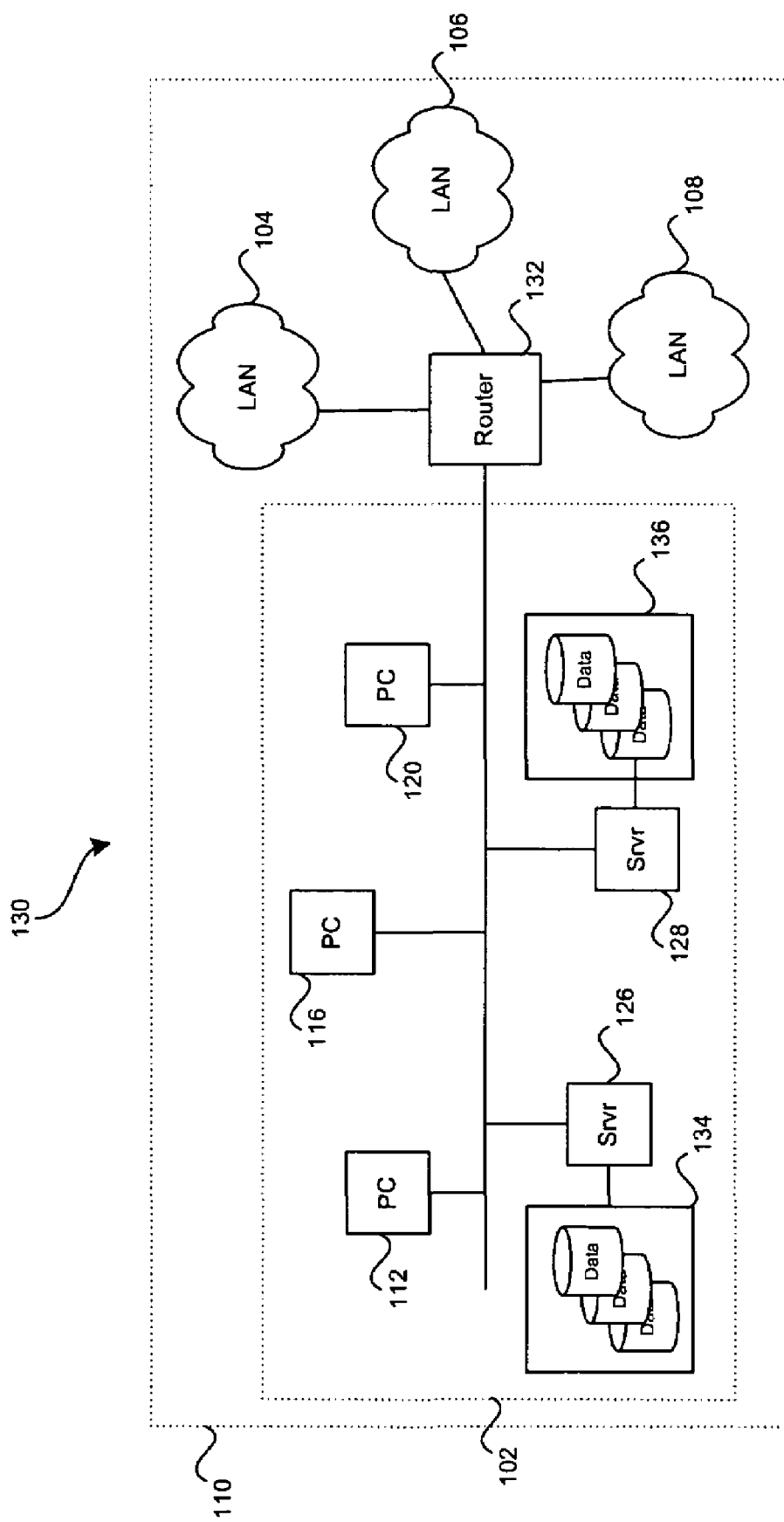
Figure 1C:
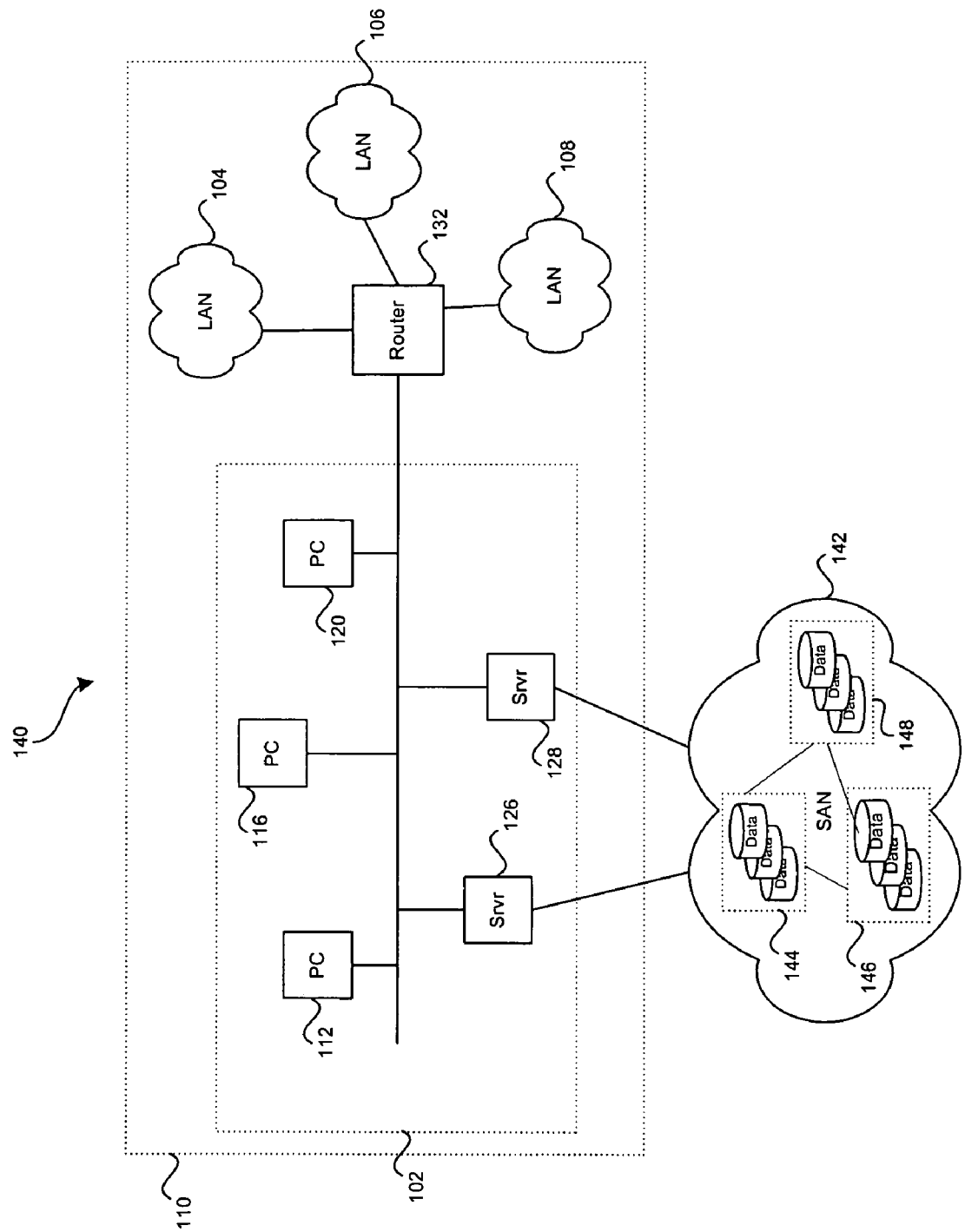
FIG. 1c is a block diagram of an improved conventional networking environment illustrating the arrangements of various communication and storage entities, which addresses some of the drawbacks of the networking environment of FIG. 1a and FIG. 1b.
Figure 2:
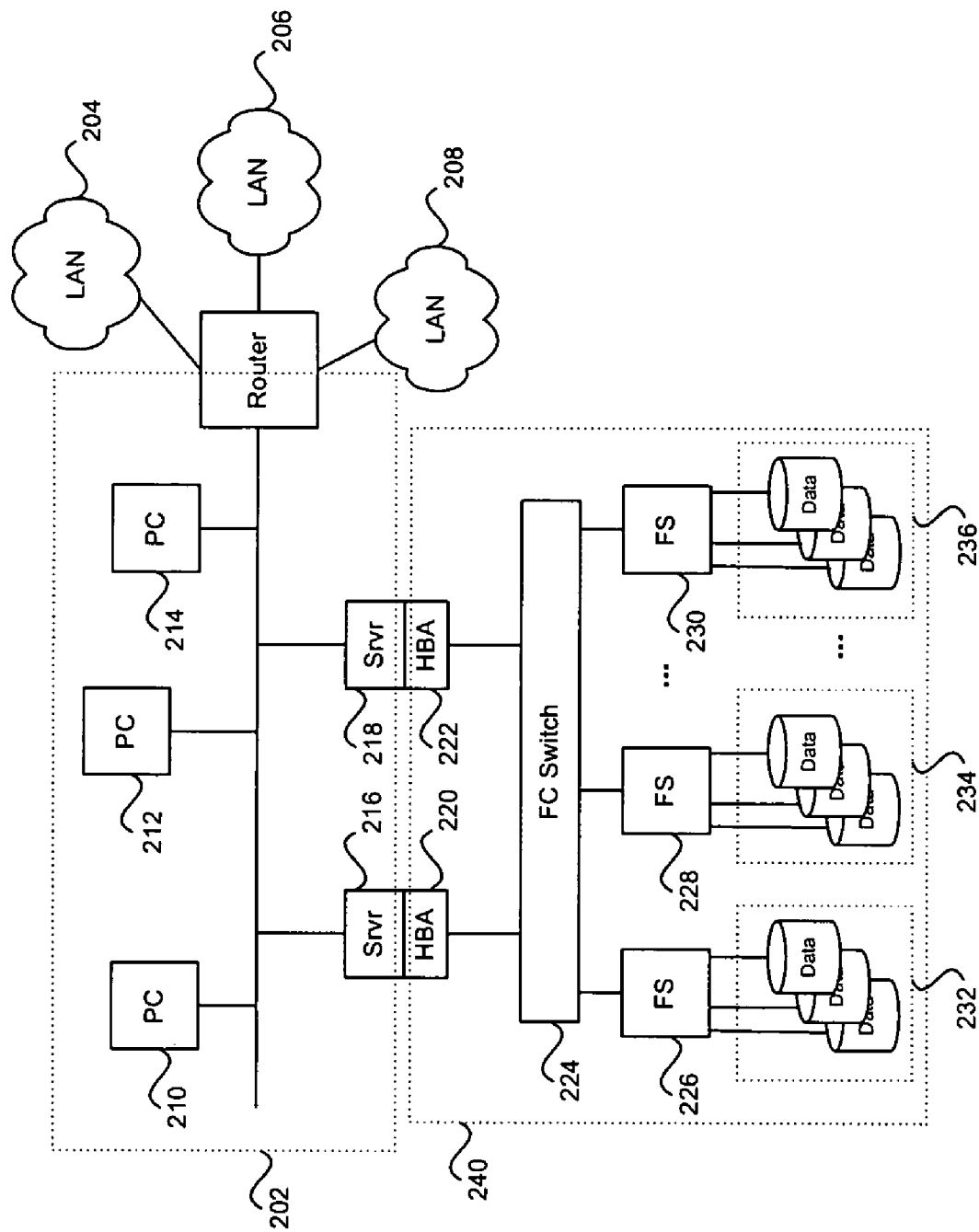
FIG. 2 is a block diagram of an exemplary local area network (LAN) coupled to a storage area network (SAN).

Certain embodiments of the invention may be found in a method and system for operating ports in port bypass controllers through LIPf7 origination detection and LIPf8 suppression, which may be utilized, for example, in storage systems. Aspects of the method may comprise receiving a data stream at a receive port Rx(n) of a port bypass controller, where n is an integer indexing a port in the port bypass controller. LIPf8 primitives in the received data stream may be suppressed at the receive port Rx(n) and LIPf7 primitives inserted in place of at least a portion of the suppressed LIPf8 primitives.

The introduction of active signal integrity (Active-SI™) and active line integrity (Active-LI™) technology by Broadcom Corporation of Irvine, Calif., has provided various improvements with regards to reliability, availability, and serviceability (RAS) of network connections. Active signal integrity (Active-SI™) and active line integrity (Active-LI™) technology incorporates, for example, the equivalent of a bit error rate (BER) tester (BERT), an oscilloscope, and a protocol analyzer into some or all of the ports of an integrated communication device. Active-SI/LI improves system reliability, availability, and serviceability (RAS) from the chip level and may aid in, for example, system development, system integration and testing, and system deployment and startup. Accordingly, active-SI/LI provides improved time to market (TTM) and may also aid in identifying and isolating faulty system components or entities in the field. All of this translates to reduced ownership cost and significantly lower maintenance costs.

With regard to, for example, storage systems or arrays, active signal integrity (Active-SI™) and active line integrity (Active-LI™) technology may be incorporated in each fibre channel (FC) port creating a new class of intelligent port bypass controllers (PBCs) which may be referred to as intelligent bunch of disks (IBODs). IBOD devices comprise the intelligence of switches but are nonetheless, transparent to data traffic. Accordingly, this may eliminate any possible protocol interoperability problems that may arise. Each IBOD port may operate as full retiming with nominal latency of, for example, 2 to 4 fibre channel (FC) words or in repeating mode with a latency of, for example, less than one (<1) FC word. Since, IBOD devices are transparent to data traffic, any conventional or other backplane may be converted with minimal redesign effort in order to utilize active signal integrity (Active-SI™) technology and active line integrity (Active-LI™) technology for improved reliability, availability and serviceability (RAS).

Although Active-SI and Active-LI technologies may be incorporated in the exemplary port bypass controllers disclosed herein, the invention is not so limited. Accordingly, aspects of the method and system for operating ports in port bypass controllers through LIPf7 origination detection and LIPf8 suppression may be practiced without utilizing Active-SI and Active LI technologies.

Figure 4A:
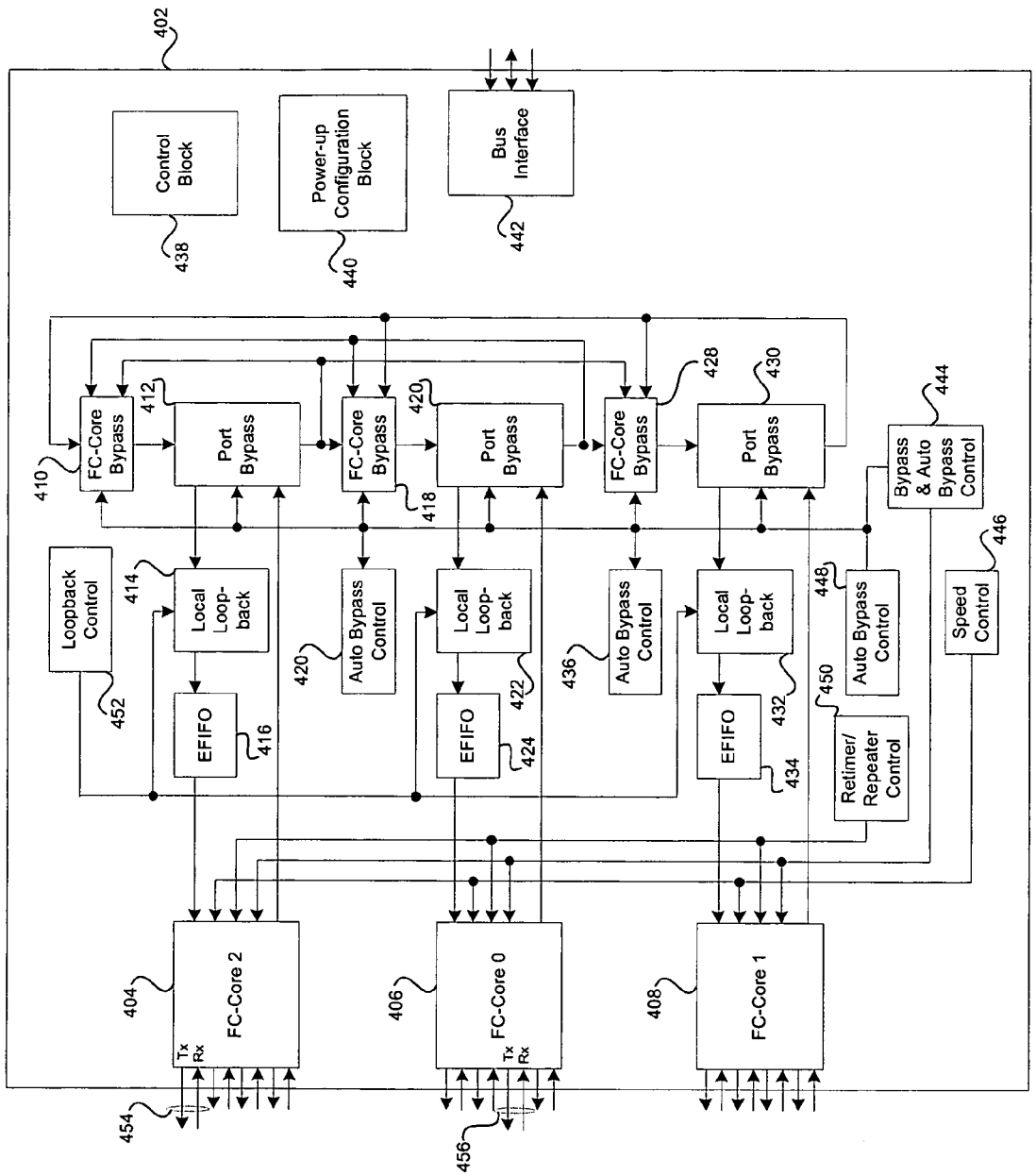
FIG. 4a is a block diagram illustrating an exemplary IBOD device that may be utilized in connection with port bypass controller operation, in accordance with and embodiment of the invention.

FIG. 4a is a block diagram illustrating an exemplary IBOD device that may be utilized in connection with port bypass controller operation, in accordance with and embodiment of the invention. Referring to FIG. 4a, the exemplary IBOD device 400 may comprise a plurality of FC-Cores including FC-Core 0 (406), FC-Core 1 (408), and FC-Core 2 (404), a control block 438, a power-up configuration block 440 and a bus interface block 442.

Each of the FC-Cores 404, 406, 408 has an associated control block which comprises a FC-Core bypass block, a port bypass block, a local loopback block and an EFIFO block. In this regard, the control block for FC-Core 2 (404) comprises FC-Core bypass block 410, port bypass block 412, local loopback block 414 and EFIFO 416. The control block for FC-Core 0 (406) comprises FC-Core bypass block 418, port bypass block 420, local loopback block 422 and EFIFO 424. The control block for FC-Core 1 (408) comprises FC-Core bypass block 428, port bypass block 430, local loopback block 432 and EFIFO 434.

The IBOD device 402 may also comprise a bypass and automatic bypass control block 444, speed control block 446, auto bypass control block 448, retimer/repeater control block 450 and loopback control block 452. The bypass and automatic bypass control block 444, speed control block 446 and retimer/repeater control block 450 may be coupled to each of the FC-Cores 404, 406, 408. The bypass and automatic bypass control block 444 and automatic bypass control block 448 may be coupled to each of the port bypass block 412, 420 and 430. The loopback control block 452 may be coupled to each of the local loopback blocks 414, 422, 432 for each of the FC-Cores 404, 406, 408 respectively.

Each of the FC-Core bypass blocks 410, 718, 428 associated with FC-Cores 404, 406, 408 may comprise a multiplexer or other suitable selector that may be adapted to bypass a corresponding FC-Core when the multiplexer or selector is enabled. For example, FC-Core bypass block 410 may be utilized to bypass FC-core 404 when the FC-Core bypass block 410 is enabled. Similarly, the FC-Core bypass block 418 may be utilized to bypass FC-core 406 when the FC-Core bypass block 418 is enabled. Finally, FC-Core bypass block 428 may be utilized to bypass FC-core 408 when the FC-Core bypass block 428 is enabled. When a FC-Core is bypassed, all the ports for that FC-Core are bypassed.

Each of the port bypass blocks 412, 420, 430 associated with FC-Cores 404, 406, 408 respectively may comprise suitable logic, circuitry and/or code that may be adapted to effectuate port bypass.

Each of the local loopback blocks 414, 422, 432 associated with FC-Cores 404, 406, 408 respectively may comprise suitable logic, circuitry and/or code that may be adapted to place a corresponding port of the FC-Core in a local loopback. In this regard, a particular local loopback block may internally configure a particular port of a FC-Core so the transmit (Tx) and receive (Rx) lines for that particular port are cross connected. For example, local loopback block 414 may internally configure port 454 of FC-Core 404 so that its transmit (Tx) and receive (Rx) lines are cross connected. The loopback control block 452 may comprise suitable logic, circuitry and/or code that may be adapted to control each of the local loopback blocks 414, 422, 432 for each of the FC-Cores 404, 406, 408 respectively. For example, loopback control block 452 may configure port 456 associated with FC-Core 406 in a local loopback mode. In local loopback mode, the transmit (Tx) lines and receive (Rx) lines for a particular port may be cross connected from within the corresponding FC-Core.

Each of the elastic FIFO (EFIFO) blocks 416, 424, 434 associated with FC-Cores 404, 406, 408 respectively may comprise suitable logic and/or circuitry that may be adapted to introduce and change a data rate and/or phase of received and/or transmitted data handled by the FC-Cores 404, 406, 406.

The bypass and automatic bypass control block 444 and the automatic bypass block 448 may comprise suitable logic, circuitry and/or code that may be adapted to control bypass of at least one of the ports for a particular FC-Core. Accordingly, the bypass and automatic bypass control block 444 and/or the automatic bypass block 448 in conjunction with a corresponding port bypass block may be utilized to bypass one or more of the ports for a particular FC-Core. For example, port bypass and automatic bypass control block 444 and/or the automatic bypass block 448 in conjunction with port bypass block 420 may be configured to enable or disable at least one port such as port 456 of FC-Core 406.

The speed control block 446 may comprise suitable logic, circuitry and/or code that may be adapted to control and adapt the operation of the FC-Cores 404, 406, 408 to a plurality of different data rates. Additionally, the speed control block may be further adapted for automatic speed negotiation.

The repeater/retimer block 450 may comprise suitable logic, circuitry and/or code that may be adapted to control retiming and repeating of signals for each of the ports for the FC-Cores integrated within the IBOD device 402.

The power-up configuration block 440 may comprise suitable logic, circuitry and/or code that may be utilized to initialize the IBOD device 402. Suitable logic may include, but is not limited to, registers and/or memory that may be adapted to store initialization parameters and/or values. For example, the power-up configuration block 440 may comprise a plurality of control registers.

The control block 438 may comprise suitable logic, circuitry and/or code that may be utilized to configure and control the operations of the IBOD device 402. Suitable logic may comprise one or more registers and/or memory that may be adapted to configure various operations for the IBOD device 402. The control block 438 may further comprise a plurality of status registers that may be read in order to determine an operational state of the IBOD device.

The bus interface block 442 may be, for example, a serial or parallel interface bus that may be adapted to provide communication between the IBOD 402 and a host processor or CPU, for example. In one exemplary embodiment of the invention, the bus interface block 442 may be a standardized I²C bus.

Figure 4B:
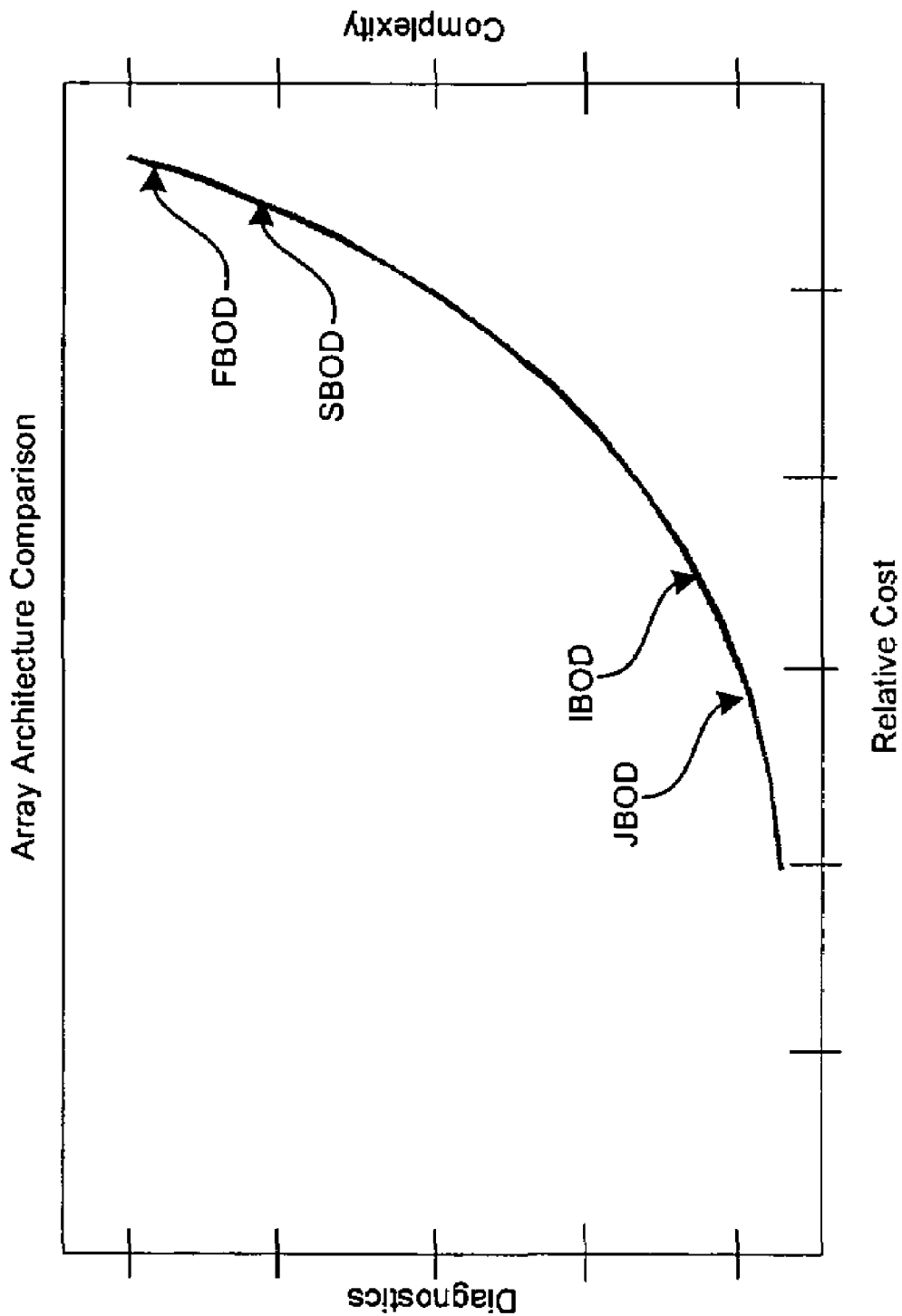
FIG. 4b is a graph illustrating a comparison of just bunch of disk (JBOD), intelligent bunch of disk (IBOD™), switched bunch of disk (SBOD), and fabric bunch of disk (FBOD™) that may be utilized in connection with port bypass controller operation, in accordance with an embodiment of the invention.

FIG. 4b is a graph illustrating a comparison of just bunch of disk (JBOD), intelligent bunch of disk (IBOD™), switched bunch of disk (SBOD), and fabric bunch of disk (FBOD™) technologies that may be utilized in connection with port bypass controller operation, in accordance with an embodiment of the invention. Referring to FIG. 4, the left vertical axis refers to diagnostics capability, the right vertical axis refers to complexity and the horizontal axis refers to relative costs. At the lower end of the curve is JBOD, next higher is IBOD, next higher is SBOD and the highest end is FBOD. One technology driving and enabling IBODs is advanced serializer/deserializer (SerDes or SERDES) technology which incorporates Active-SI and Active-LI. Although FBOD and SBOD have the highest relative cost and greatest complexity, hybrid implementations of IBOD and FBOD may be provided which offer improved scaling and performance with cost on par with SBOD.

Figure 5:
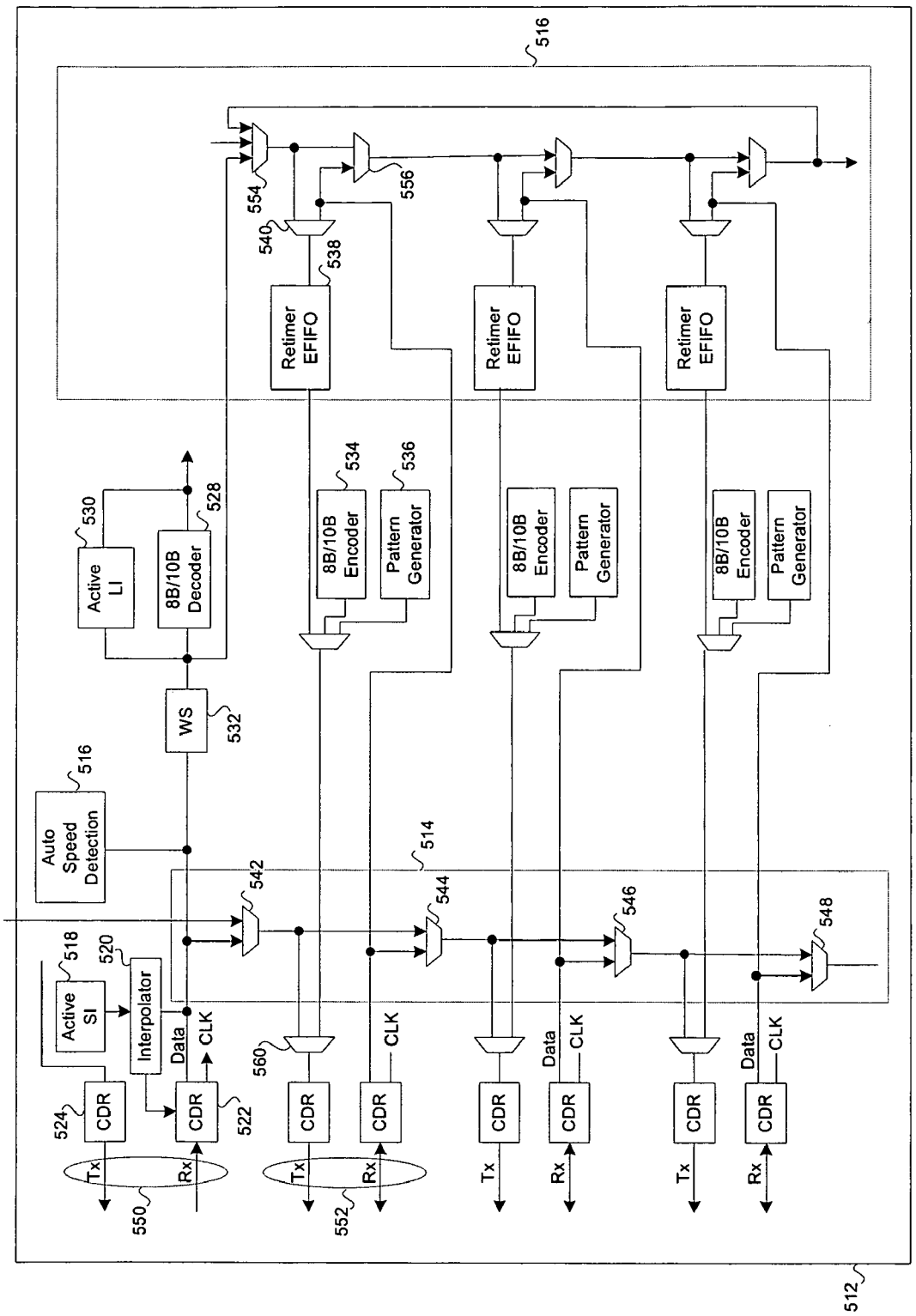
FIG. 5 is a block diagram illustrating an exemplary FC-Core repeater/retimer port switch that may be utilized in connection with the IBOD device of FIG. 4a, for example, for port bypass controller operation, in accordance with an embodiment of the invention.

FIG. 5 is a block diagram illustrating an exemplary FC-Core repeater/retimer port switch that may be utilized in connection with the IBOD device of FIG. 4a, for example, for port bypass controller operation, in accordance with an embodiment of the invention. Referring to FIG. 5, the FC-Core repeater/retimer port switch may comprise a FC-Core block 512 and a retimer switch block 516. The FC-Core block 512 may comprise an active signal integrity block 518, interpolator 520, auto speed detection block 526, word synchronization (WS) block 532, active line integrity block 530, 8B/10B decoder block 528, 8B/10B encoder block 534, and pattern generator 536.

FIG. 5 further comprises a repeater function block 514 and a retimer function block 516. The repeater function block 514 may comprise suitable logic and/or circuitry that may be utilized to implement the repeater function for each FC-Core such as FC-Core 512. The repeater function and block 516 illustrates exemplary logic that may be utilized for retiming function.

The FC-Core repeater/retimer port switch may also comprise a plurality of clock and data recovery (CDR) circuit blocks such as CDRs 524 and 522. The CDRs may be arranged in pairs in which a first CDR of a pair is configured to handle a receive (Rx) side and a second CDR of the pair is configured to handle a transmit (Rx) side for a particular port. For example, CDR 522 is configured as a receive CDR and CDR 524 is configured as a transmit CDR. The combination of a receive CDR and a transmit CDR pair may be referred to as a port. The FC-Core as illustrated comprises four (4) ports. However, the invention is not limited in this regard and each FC-Core may comprise more than or less than four (4) ports. Each port may be adapted to handle a single FC hard disk. A plurality of FC-ports may be coupled together and integrated into a single chip or integrated circuit. For example, three (3) FC-Cores each having four ports may be coupled together and integrated into a single chip which can handle 12 ports. In this regard, theoretically, a maximum of 12 hard disks may be handled by the twelve (12) ports. Although the interpolator block 520 is illustrated separately from the CDR block 522, the interpolator 520 may be part of the CDR 522. From a functional point of view, as illustrated, the CDR 522 may be viewed as an analog portion and the interpolator 520 may be viewed as a digital portion of a CDR.

The signal integrity block 518 may be adapted to initiate and manage signal integrity testing. Likewise, the active line integrity block 530 may be adapted to manage line integrity testing. U.S. application Ser. No. 10/779,001 discloses the functions and operation of active signal integrity and active line integrity and is hereby incorporated herein by reference in its entirety.

The interpolator 520 may be a hardware driven and/or software driven interpolator that may be adapted to track the phase of incoming or received data for active signal integrity operation. The auto speed detection block 526 comprises suitable logic, circuitry and/or code that may be adapted to automatically control speed negotiation at the physical coding sublayer (PCS) on the receiver side. In an embodiment of the invention, the auto speed detection block 526 may comprise a firmware algorithm the may reside on-chip within the IBOD device. The word synchronization (WS) block 532 may be adapted to provide synchronization at the physical coding sublayer (PCS) on the receiver side. In this regard, the word synchronization (WS) block 532 may be adapted to provide, for example, word boundary alignment.

The 8B/10B decoder block 528 may be a standardized 8B/10B compliant decoder that may be utilized to decode 10 bits of data into 8 bits of data. The 8B/10B encoder block 534 is a standardized 8B/10B compliant encoder that may be utilized to encode 8 bits of data into 10 bits of data. The pattern generator 536 may be adapted to generate control words or bit patterns or sequences that may be utilized, for example, for bit error rate testing. In this regard, one or more ports may be placed in loopback and tested by sending, for example, control words, ordered sets and/or bit patterns from the pattern generator 536. The auto speed detection block 526 may be adapted to detect the data speed and setup the appropriate clock signals, for example, the transmit and receive clocks, to provide the correct timing.

Figure 6:
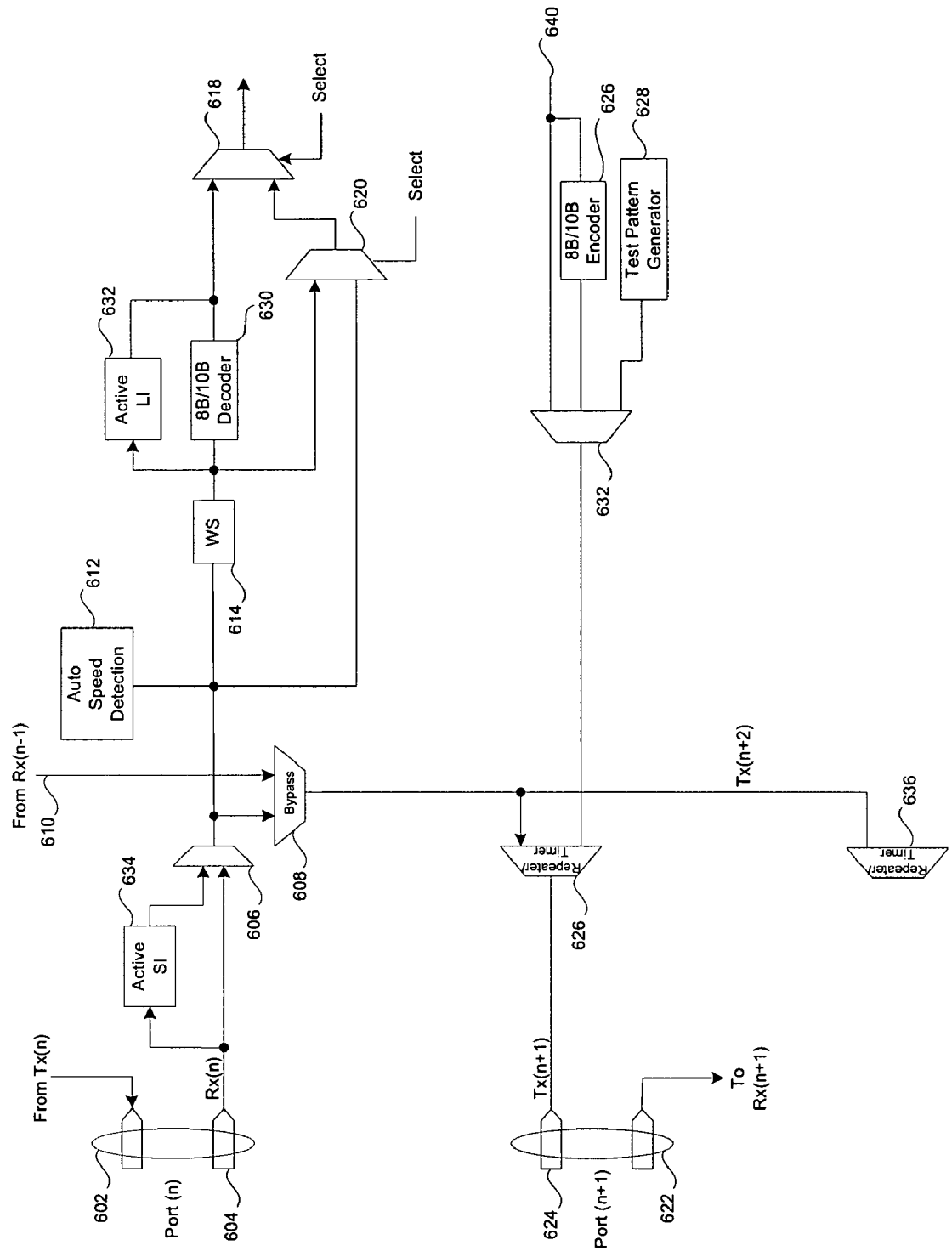
FIG. 6 is a block diagram of an exemplary architecture of an FC-Core repeater port switch for a transmit side and a receive side of the FC-Core repeater/retimer port switch of FIG. 5, for example, which may be utilized in connection with the IBOD device of FIG. 4a, for example, for port bypass controller operation, in accordance with an embodiment of the invention.

FIG. 6 is a block diagram of an exemplary architecture of an FC-Core repeater port switch for a transmit side and a receive side of the FC-Core repeater/retimer port switch of FIG. 5, for example, which may be utilized in connection with the IBOD device of FIG. 4a, for example, for port bypass controller operation, in accordance with an embodiment of the invention. FIG. 6 illustrates a transmit side of a first port 602 and a receive side of a second consecutive port 622 of the FC-Core repeater/retimer port switch of FIG. 5. Accordingly, FIG. 6 may be utilized to illustrate the operation of the repeater function block 514 illustrated in FIG. 5.

Referring to FIG. 6, there is shown a receive section 604 of port 602. For simplicity, the CDR 522 and interpolator 520 illustrated in FIG. 5 are not shown. Notwithstanding, the receive side may comprise an active signal integrity (SI) block 634, a selector 606, bypass selector 608, auto speed detection block 612, word synchronizer block 614, active line integrity (LI) block 632, 8B/10B decoder 630, selector 618 and selector 620.

Each of the selectors 606, 608, 618 and 620 may comprise suitable logic and/or circuitry that may be adapted to select, enable and/or disable one or more signals that may be coupled thereto. Accordingly, when a signal is received at port 604, the CDR and interpolator (not shown in FIG. 6) may recover the clock and the recovered clock may be utilized to demultiplex the signal. The demultiplexed signal may be passed to the active signal integrity block 634 for processing and/or it may be transferred to the selector 606. This output signal transferred to the selector 606 may be utilized to provide timing for the transmit port Tx(n+1) 624.

The output signal from the selector or MUX 606 may be transferred to the bypass multiplexer or selector 608, and/or the auto speed detection block 612 may determine a data rate of the demultiplexed signal. Once the data rate of the signal has been determined, the resulting timing information may be utilized by the word synchronization (WS) block 614 to align to the word boundaries in the demultiplexed received signal. With regard to port switching, the active line integrity block 632 and the active signal integrity block 634 may not be required.

A resulting signal from the word synchronization (WS) block 614 may be decoded by the 8B/10B decoder block 630 or it may be processed by the active line integrity block 632. The selector or multiplexer 620 may be adapted to select between an output of the word synchronizer block 614 and non-word synchronized version of the demultiplexed received signal. The selector or multiplexer 618 may be adapted to select between an output of the 8B/10B decoder and the selector 620.

In general, in repeater mode, a signal received at a current port from a prior port in the chain, for example, may be repeated and passed onto a successive port in the chain. The CDR for the current receive port may be adapted to recover the clock signal from the signal received from the prior port in the chain. This recovered clock signal may be passed on to a successive port in the chain where it may be utilized to drive the transmit side of the successive port. In this regard, the output signal from the selector or MUX 606 may be transferred to the bypass selector or multiplexer 608 and upon selection by the bypass selector 608, the signal may be repeated to port 632. In the bypass mode, signal 610 from port Rx(n−1) may bypass port 602 and be transferred to ports 624 and/or Tx(n+2). The bypass selector or multiplexer 608 may also be referred to as a repeater selector or multiplexer. In a case where port 550 is bypassed, the timing may be acquired from a prior port via signal 610. Signal 610 may be derived from, for example, another FC-Core in the chain.

On the receive side, signal 640 may be passed directly to the selector or multiplexer 632 or signal 640 may be 8B10B encoded by the 8B10B encoder block 626. Signal 640 may be a retimed signal, for example. The resulting 8B10B encoded signal may be transferred to the selector 632. The selector or multiplexer 632 may select either the resulting encoded 8B10 signal or the signal 640 may be transferred to the retransmitter/retimer selector 626. The retransmitter/retimer selector 626 may select the output of the selector 632 to be transferred to the transmit port 624. The test pattern generator 628 may be utilized for testing and may be configured to generate test codes and/or patterns such as fibre channel codes, frames and/or ordered sets. Accordingly, when utilized in conjunction with port bypass or switching, any port may be readily tested without the need to reconfigure or initialize the port, or to employ expensive external test equipment.

Figure 7:
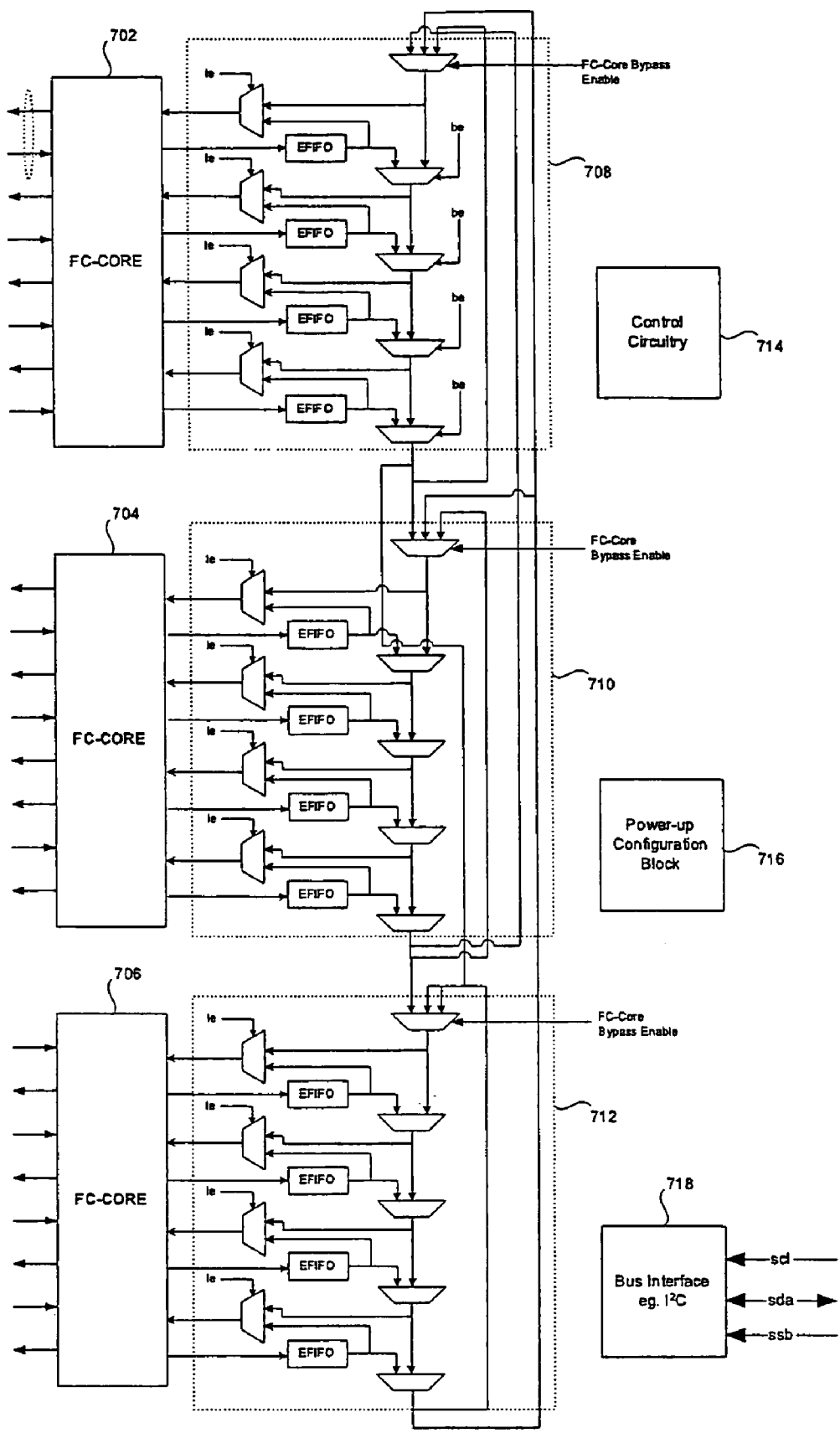
FIG. 7 is a block diagram of an exemplary embodiment of a retimer port switch architecture that may be utilized in connection with the IBOD device of FIG. 4a, for example, for port bypass controller operation, in accordance with an embodiment of the invention.

FIG. 7 is a block diagram of an exemplary embodiment of a retimer port switch architecture that may be utilized in connection with the IBOD device of FIG. 4a, for example, for port bypass controller operation, in accordance with an embodiment of the invention. Referring to FIG. 7, there is shown FC-Cores 702, 704, 706 and their respective retimer blocks 708, 710, 712, control circuitry block 714, power up configuration block 716, and a bus interface block 718 such as an I²C bus interface.

Figure 8:
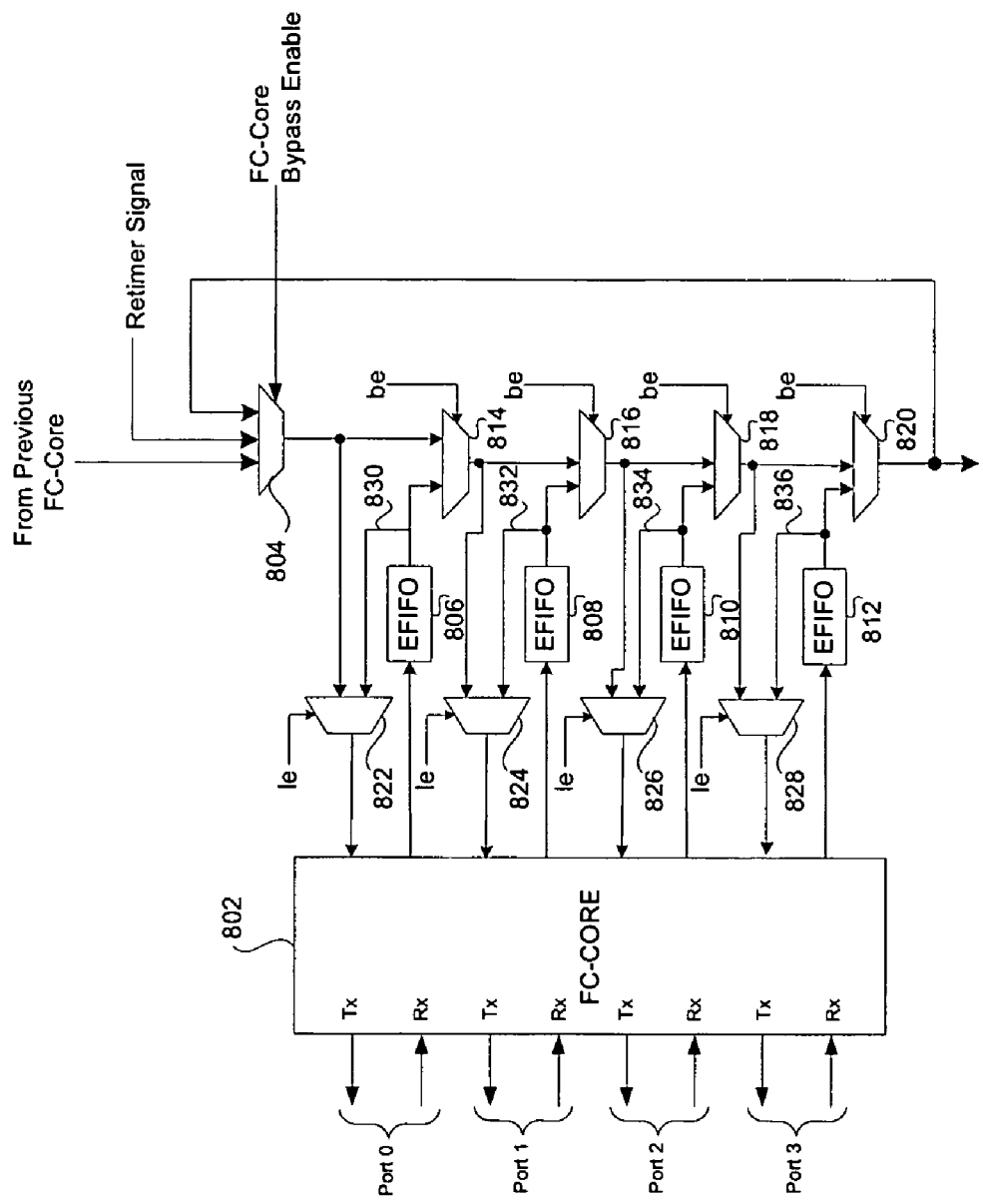
FIG. 8 is a block diagram of a portion of the retimer port switch architecture of FIG. 7 that may be utilized for handling a single FC-Core which may be utilized in connection with the IBOD device of FIG. 4a, for example, for port bypass controller operation, in accordance with an embodiment of the invention.

FIG. 8 is a block diagram of a portion of the retimer port switch architecture of FIG. 7 that may be utilized for handling a single FC-Core which may be utilized in connection with the IBOD device of FIG. 4a, for example, for port bypass controller operation, in accordance with an embodiment of the invention. Referring to FIG. 8, there is shown FC-Core 802, EFIFOs 806, 808, 810, 812 loopback enable selectors or multiplexers 822, 824, 826, 828, bypass selectors 814, 816, 818, 820 and FC-Core bypass enable selector or multiplexer 804. FIG. 8 further comprises loopback paths 830, 832, 834 and 836.

The FC-Core bypass enable selector or multiplexer 804 may be utilized to enable or disable the ports in the FC-Core. For example, if the FC-Core bypass enable selector 804 is enabled, then any of port 0, port 1, port 2 and port 3 may be active. However, if the FC-Core bypass enable selector 804 is disabled, then all of the FC-Core ports including port 0, port 1, port 2 and port 3 will be inactive. In effect, when the FC-Core bypass enable selector 804 is disabled, then the FC-Core 802 is effectively disabled. Notwithstanding, in the case where the FC-Core bypass enable selector 804 is enabled, then any one or more of the of the port for FC-Core 802 may be bypassed. In this regard, bypass enable (be) selector 814 may be utilized to bypass port 0 and bypass enable selector 816 may be utilized to bypass port 1. Similarly, bypass enable selector 818 may be utilized to bypass port 2 and bypass enable selector 820 may be utilized to bypass port 3.

The loopback enable (le) selector 822 may be utilized to place port 0 in loopback via path 830 and the loopback enable selector 824 may be utilized to place port 1 in loopback via path 832. Similarly, the loopback enable selector 826 may be utilized to place port 2 in loopback via path 834 and the loopback enable selector 828 may be utilized to place port 3 in loopback via path 836. For example, a signal received from port 3 may pass through EFIFO 812 and be loopbacked through path 836. Similarly, a signal received from port 1 may pass through EFIFO 808 and be loopbacked through path 832.

Figure 9:
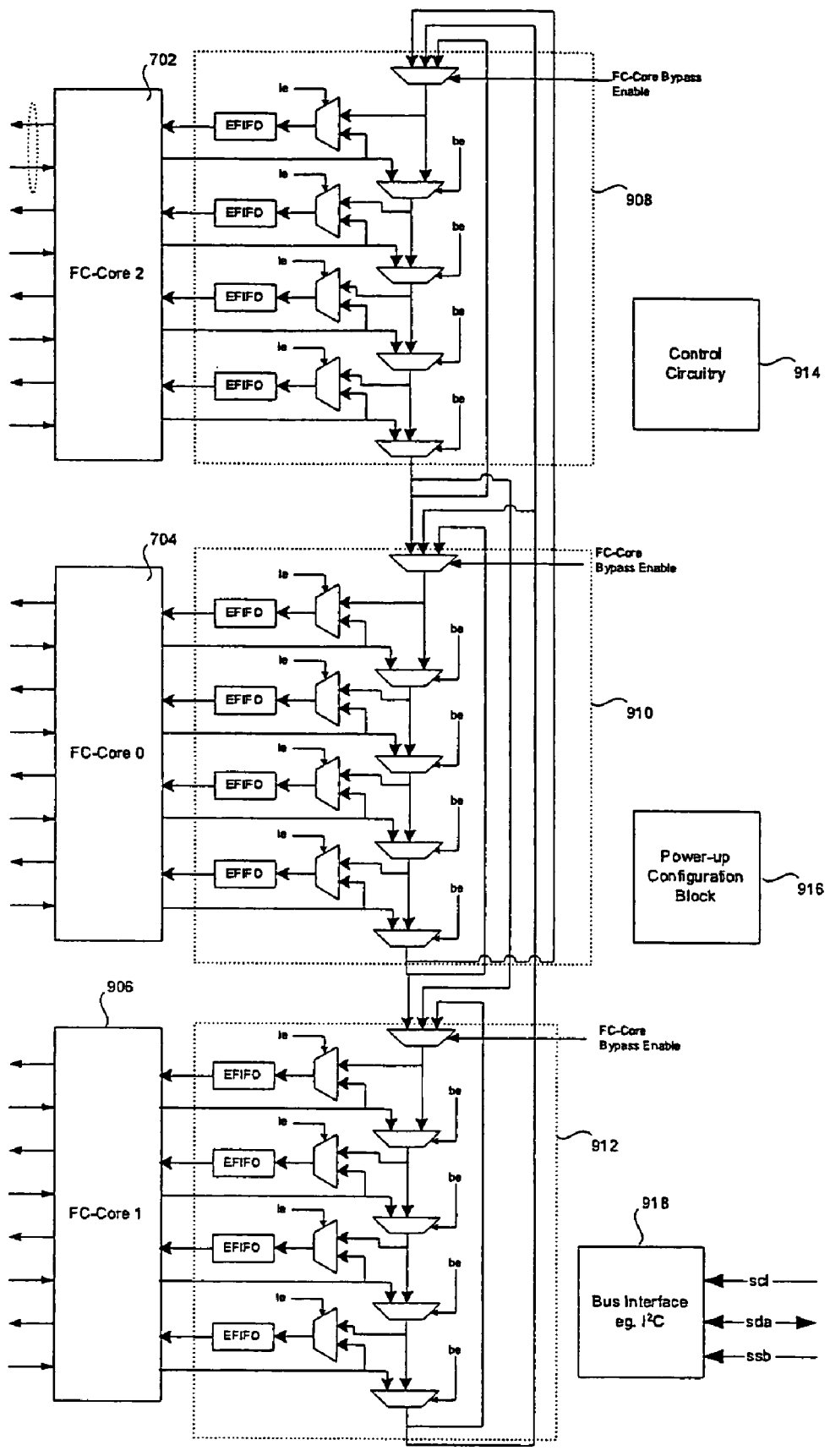
FIG. 9 is a block diagram of another exemplary embodiment of a retimer port switch architecture that may be utilized in connection with the IBOD device of FIG. 4a, for example, for port bypass controller operation, in accordance with an embodiment of the invention.

FIG. 9 is a block diagram of another exemplary embodiment of a retimer port switch architecture that may be utilized in connection with the IBOD device of FIG. 4a, for example, for port bypass controller operation, in accordance with an embodiment of the invention. Referring to FIG. 9, there is shown FC-Cores 902, 904, 906 and their respective retimer blocks 908, 910, 912, control circuitry block 914, power up configuration block 916, and a bus interface block 918 such as an I²C interface.

Figure 10:
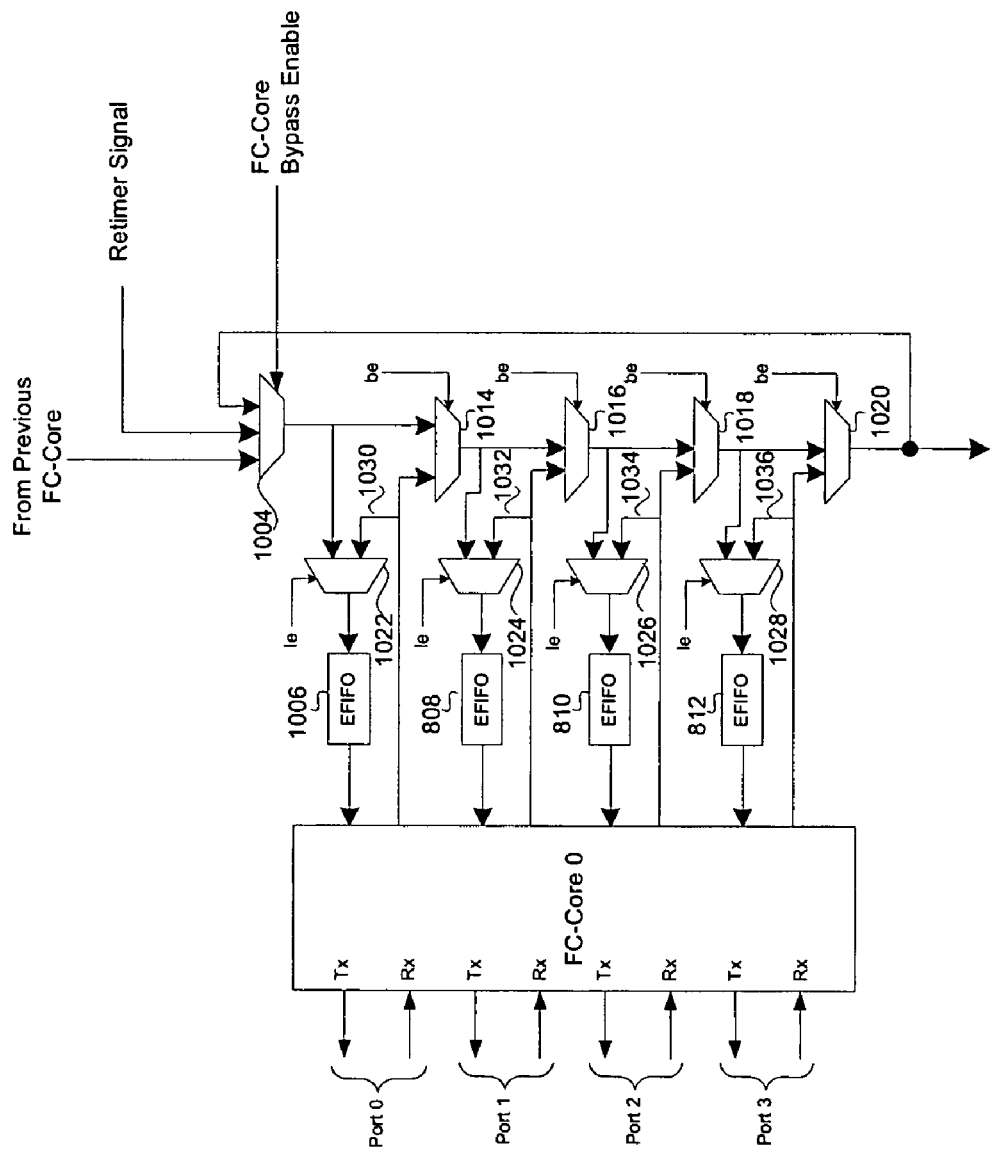
FIG. 10 is a block diagram of a portion of the retimer port switch architecture of FIG. 9, for example, that may be utilized for handling a single FC-Core which may be utilized in connection with the IBOD device of FIG. 4a, for example, for port bypass controller operation, in accordance with an embodiment of the invention.

FIG. 10 is a block diagram of a portion of the retimer port switch architecture of FIG. 9, for example, that may be utilized for handling a single FC-Core which may be utilized in connection with the IBOD device of FIG. 4a, for example, for port bypass controller operation, in accordance with an embodiment of the invention. Referring to FIG. 10, there is shown FC-Core 1002, EFIFOs 1006, 1008, 1010, 1012, loopback enable selectors or multiplexers 1022, 1024, 1026, 1028, bypass selectors 1014, 1016, 1018, 1020 and FC-Core bypass enable selector or multiplexer 1004. In FIG. 10, the EFIFOs 1006, 1008, 1010, 1012 are configured so that they are located after or at the output of the loopback enable selectors as opposed the FIG. 8 where the EFIFOs 806, 808, 810, 812 are placed before or at the inputs of the bypass selectors 814, 816, 818, 820.

The FC-Core bypass enable (be) selector or multiplexer 1004 may be utilized to enable or disable the ports in the FC-Core. For example, if the FC-Core bypass enable selector 1004 is enabled, then any of port 0, port 1, port 2 and port 3 may be active. However, if the FC-Core bypass enable selector 1004 is disabled, then all of port 0, port 1, port 2 and port 3 will be inactive. In effect, when the FC-Core bypass enable selector 1004 is disabled, then the FC-Core 1002 is effectively disabled. Notwithstanding, in the case where the FC-Core bypass enable selector 1004 is enabled, then any one or more of the ports for FC-Core 1002 may be bypassed. In this regard, bypass enable (be) selector 1014 may be utilized to bypass port 0 and bypass enable selector 1016 may be utilized to bypass port 1. Similarly, bypass enable selector 1018 may be utilized to bypass port 2, and bypass enable selector 1020 may be utilized to bypass port 3.

The loopback enable (le) selector 1022 may be utilized to place port 0 in loopback via path 1030 and the loopback enable selector 1024 may be utilized to place port 1 in loopback via path 1032. Similarly, the loopback enable selector 1026 may be utilized to place port 2 in loopback via path 1034 and the loopback enable selector 1028 may be utilized to place port 3 in loopback via path 1036. For example, a signal received from port 3 may pass through EFIFO 1012 and be loopbacked through path 1036. Similarly, a signal received from port 1 may pass through EFIFO 1008 and be loopbacked through path 1032.

The retimer signal 1040 may be coupled to any of the ports of the FC-Core 1002 whenever the FC-Core bypass enable selector 1004 is enabled. For example, with the FC-Core bypass enable selector 1004 enabled and the bypass selector 1014 enabled, the retimer signal may be coupled to the EFIFO 1008 for port 2. However, in this case, if the bypass selector 1016 is disabled, then the recovered clock from port 2 will be supplied to port 3.

Figure 11:
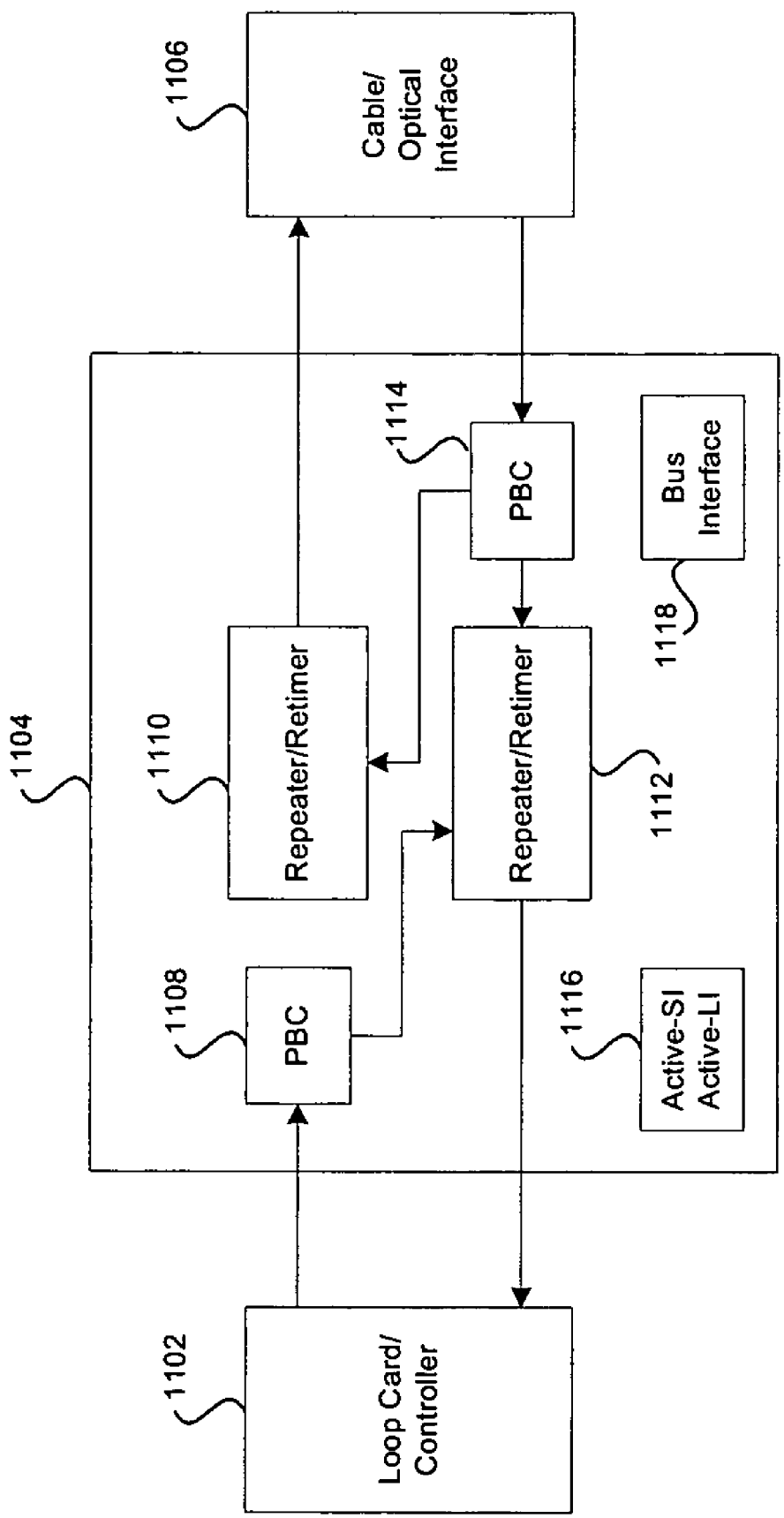
FIG. 11 is a block diagram illustrating an exemplary dual retimer/repeater application that may be utilized in connection with port bypass controller operation, in accordance with an embodiment of the invention.

FIG. 11 is a block diagram illustrating an exemplary dual retimer/repeater application that may be utilized in connection with port bypass controller operation, in accordance with an embodiment of the invention. Referring to FIG. 11, there is shown a loop card/controller block 1102, a dual retimer/repeater switch block 1104 and a cable/optical interface block 1106. The dual retimer/repeater switch block 1104 may comprise a port bypass controller blocks 1108, 1114, repeater/retimer blocks 1110, 1112, active-SI and active-LI block 1116 and bus interface block 1118. The loop card controller 1102 may be a CPU or other controller device that may be adapted to handle a plurality of dual retimer/repeater switch blocks, which may be coupled to a backplane bus, for example. The cable optical interface 1106 may comprise optical and/or electrical interfaces which may be adapted to provide coupling to a transmission media.

In the dual retimer/repeater configuration of FIG. 11, the port bypass controller 1104 and the repeater/retimer 1110 may be adapted to handle the transmit side from the loop card/controller block 1102 to the cable/optical interface block 1106. Similarly, the port bypass controller 1114 and the repeater/retimer 1112 may be adapted to handle the receive side to the loop card/controller block 1102 from the cable/optical interface block 1106. The PBC 1108 on the transmit side may be coupled to the repeater/retimer block 1112 on the receive side to facilitate the repeater and retimer functions. In this regard, clock signals may be recovered from ports on the receive side and utilized to drive ports on the transmit side. In a similar manner, PBC 1114 on the receive side may be coupled to the repeater/retimer block 1110 on the transmit side to facilitate the repeater and retimer functions. In this regard, clock signals may be recovered from ports on the receive side and utilized to drive ports on the transmit side.

Figure 12:
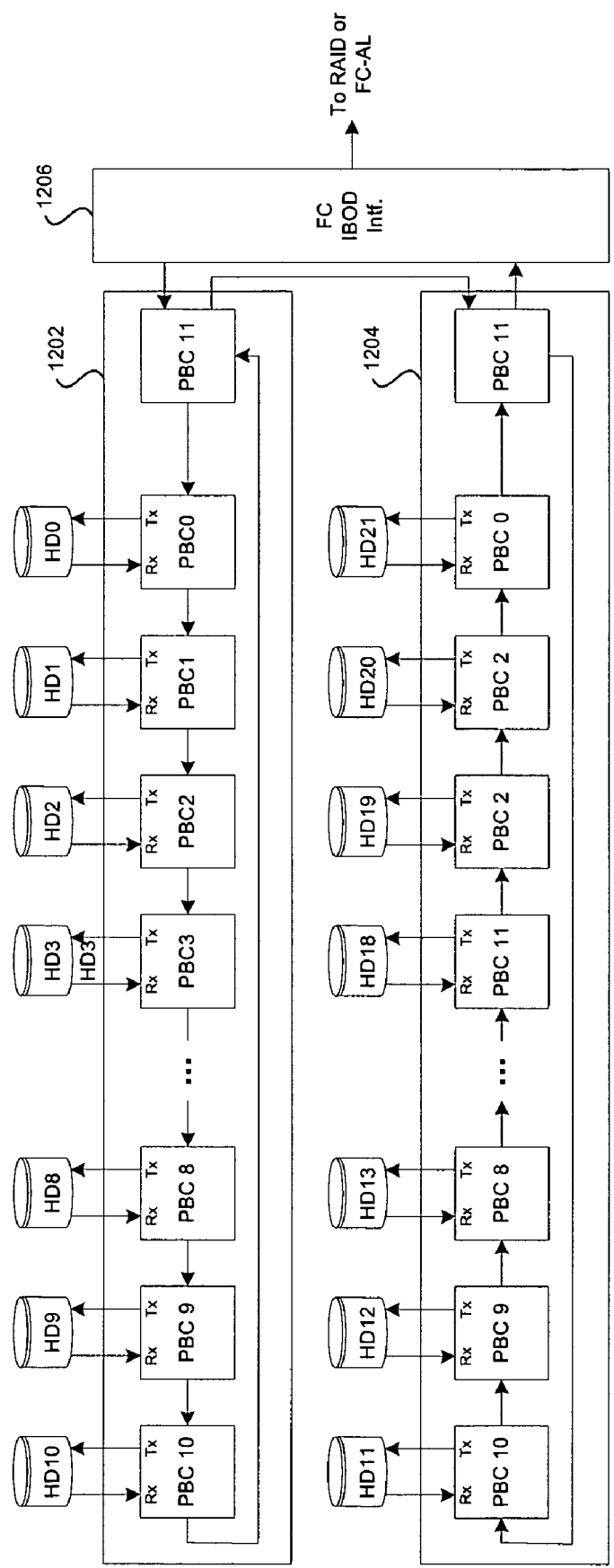
FIG. 12 is a block diagram illustrating an exemplary 12-port PBC IBOD application that may be utilized in connection with port bypass controller operation, in accordance with an embodiment of the invention.

FIG. 12 is a block diagram illustrating an exemplary 12-port PBC IBOD application that may be utilized in connection with port bypass controller operation, in accordance with an embodiment of the invention. Referring to FIG. 12, there is shown FC-Cores 1202, 1204 and an FC IBOD interface block 1206. Each of the FC-Cores 1202, 1204 comprises 12 ports including ports 0-11. One port in each of the FC-Cores 1202, 1204 is utilized as an interface port which couples the FC-Cores 1202, 1204 to the FC-IBOD interface block 1206. In this regard, each of the FC-Cores 1202, 1204 may be adapted to handle a maximum of 11 hard disks since one port is utilized for the interface port.

FIG. 12 also illustrates the daisy chaining of 22 hard disks utilizing two (2) FC-Cores. In this regard, the ports in FC-Core 1202 are chained with PBC0 being the first port and PBC10 in FC-Core 1204 being the last port in the chain. PBC10 in FC-Core 1202 is coupled to PBC0 in FC-Core 1204 via the interface PBCS, namely PBC11 of FC-Core 1202 and PBC11 of FC-Core 1204. In operation, data from the FC IBOD interface 1206 may be transferred to PBC11 of FC-Core 1202, traverse ports PBC0 through PBC10 of FC-Core 1202, pass back through PBC11 of FC-Core 1202 and into PBC11 of FC-Core 1204, traverse PBC10 through PBC0 of FC-Core 1204 and pass back through PBC11 of FC-Core 1204 into the FC IBOD interface 1206.

In accordance with various embodiment of the invention, dual switching may be provided utilizing, for example, separate retimer and repeater working in unison and this may significantly improve latency for the ports of the FC-Core. In an aspect of the invention, the retimer may be optimized for maximum flexibility and the repeater may be optimized for low latency. Automatic multi-port bypass may also be provided in order to minimizing latency among the ports of the FC-Core. The flexible architecture provided by the FC-Core may facilitate the coexistence of a plurality of functions, for example, port bypass, multi-port bypass, loopback and continuous monitoring of incoming signals in a port bypass controller.

Figure 13:
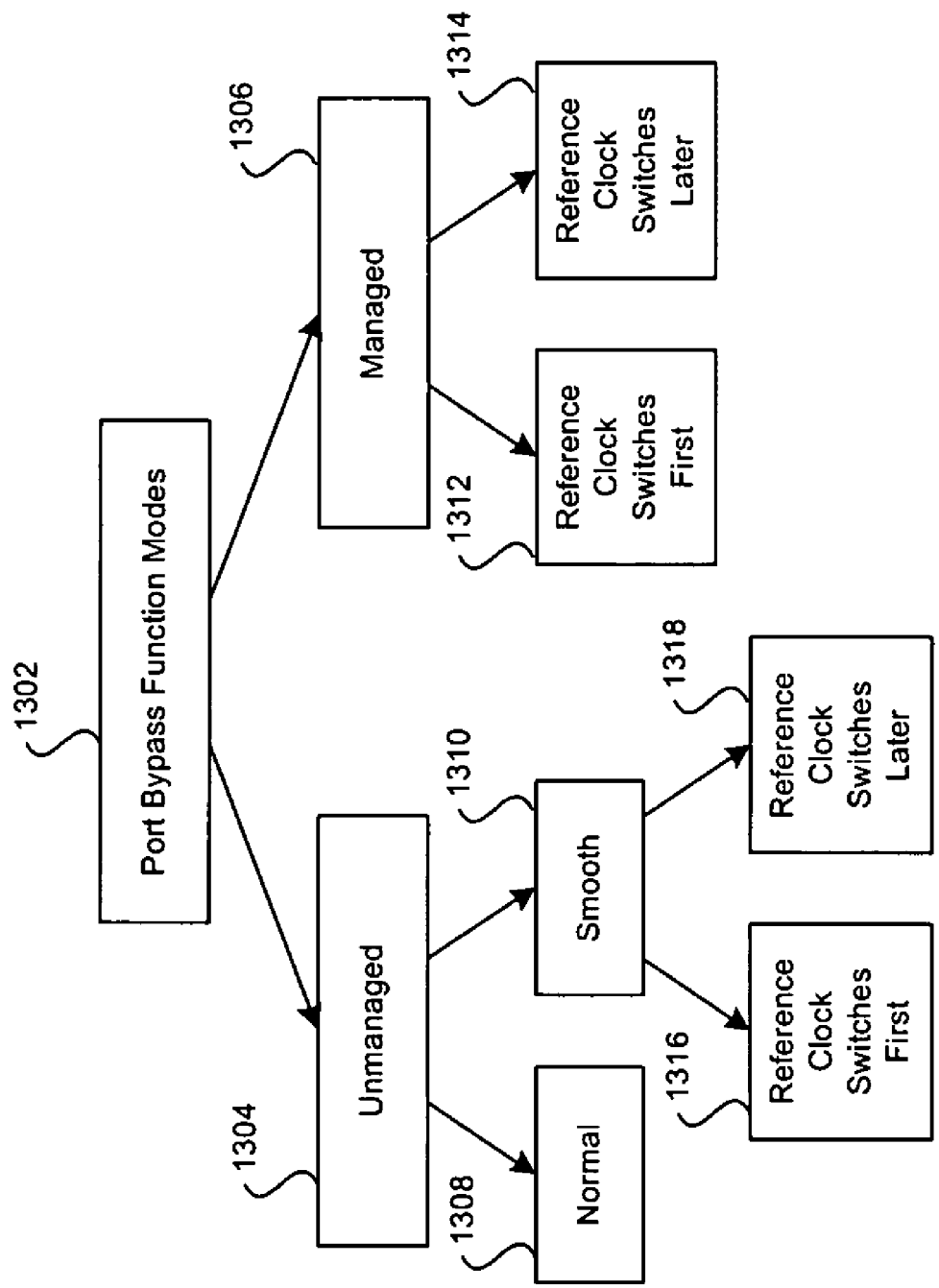
FIG. 13 is a block diagram illustrating various exemplary modes and sub-operating modes for facilitating port bypass, in accordance with an embodiment of the invention.

In accordance with various aspects of the invention, the port bypass controller may utilize, for example, two modes for facilitating port bypass. FIG. 13 is a block diagram illustrating various exemplary modes and sub-operating modes for facilitating port bypass, in accordance with an embodiment of the invention. Referring to FIG. 13, the port bypass function modes 1302 may comprise an unmanaged mode 1304 and a managed mode 1306. The unmanaged mode 1304 may comprise a normal mode 1308 and a smooth mode 1310. The smooth mode 1310 may comprise a mode in which a reference clock switches first 1316 and a mode in which the reference clock switches later 1318. The managed mode 1306 may also comprise a mode in which a reference clock switches first 1312 and a mode in which the reference clock switches later 1314.

The unmanaged mode 1304 may comprise executing the port bypass function based on an input by a user via, for example, a microprocessor or controller interface. The managed mode 1306 may provide automatic port bypass functionality based on the occurrence of at least one identified internal fault condition on each link handled by a port of the port bypass controller.

In the unmanaged port bypass mode 1304, port bypass may be manually achieved and the port bypass controller may provide link failure information to a microprocessor or host system via, for example, an interrupt pin. In this regard, the port bypass controller may have, for example, a dedicated interrupt pin or a general purpose I/O pin that may be configured as an interrupt pin. In an embodiment of the invention, the port bypass controller may provide two interrupts (pins), for example. Accordingly, a first interrupt pin may be utilized for a link interrupt and a second interrupt pin may be utilized for a general interrupt. The microprocessor or host may execute an interrupt routine to handle the interrupt generated by the port bypass controller.

The port bypass controller may utilize, for example, the link interrupt for handling port bypass. The link interrupt may be utilized to indicate one or more of a plurality of failure conditions. These failure conditions may comprise: a loss of synchronization (LOSYNC) detected by the CDR and reported by the FC-SERDES; a LIPf8 primitive such as three consecutive LIPf8s detected at the receiver (Rx) port or path; a loss of signal (RX_LOS) detected in the Rx port or path; and/or a transmit failure or fault (TX_FAULT) condition reported via, for example, a pin by the device connected to the port. The same pin or another pin on the port bypass controller may also be utilized to set a bypass select condition in the port bypass controller. The device connected to the port may be a hard disk. Each interrupt generated by one or more of the failure conditions may be individually masked. LIPf8 represents link initial protocol (LIP) having a value of OXF8.

Figure 14:
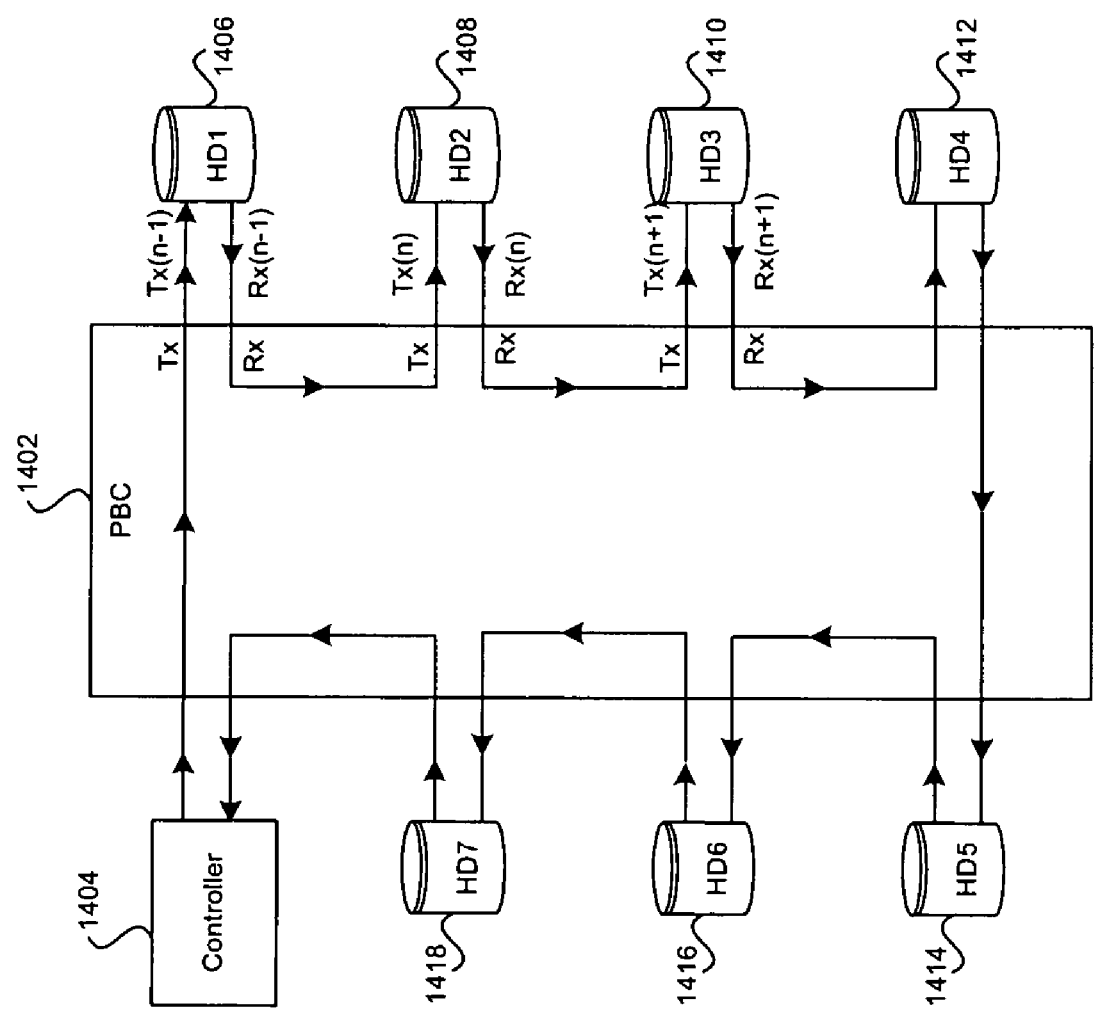
FIG. 14 is a block diagram of an exemplary port bypass controller system configured to operate in a normal operating mode that may be utilized in connection with LIPf7 origination detection and LIPf8 suppression in a port bypass controller, in accordance with an embodiment of the invention.

The normal unmanaged mode 1308 may be adapted to provide the most basic operating mode and may alternatively be referred to as a manual mode. FIG. 14 is a block diagram of an exemplary port bypass controller system configured to operate in a normal operating mode that may be utilized in connection with LIPf7 origination detection and LIPf8 suppression in a port bypass controller, in accordance with an embodiment of the invention. Referring to FIG. 14, there is shown a port bypass controller (PBC) 1402, a controller 1404 and a plurality of hard disks 1406, 1408, 1410, 1412, 1414, 1416, 1418. The port handling hard disk 1406 comprises transmit section Tx(n−1) and Rx(n−1). The port handling hard disk 1408 comprises transmit section Tx(n) and Rx(n). The port handling hard disk 1410 comprises transmit section Tx(n+1) and Rx(n+1). The controller 1404 may be for example, a centralized process such as a backplane controller but may be adapted to handle a plurality of controls.

Figure 3:
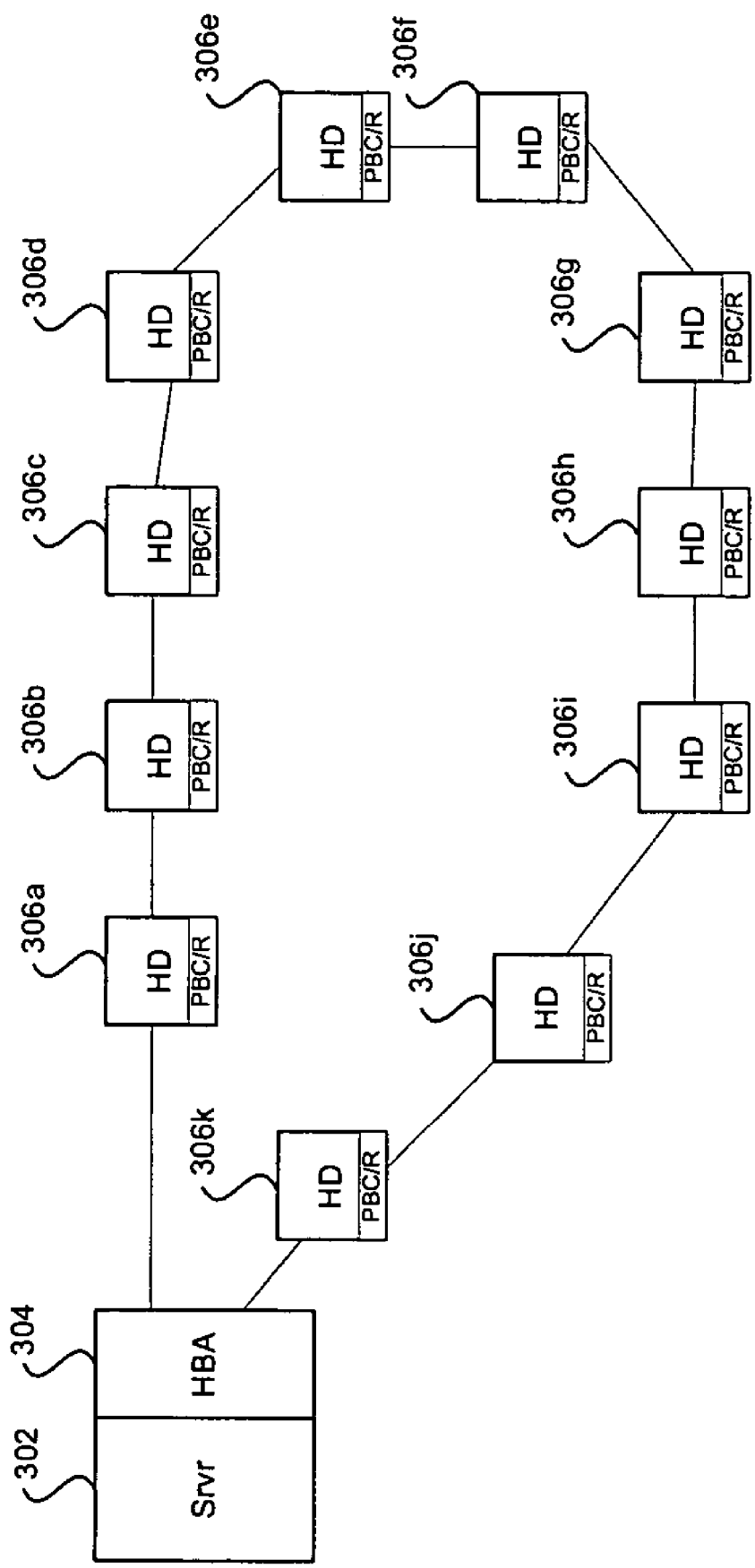
FIG. 3 is a block diagram of a conventional fibre channel arbitrated loop arrangement which may be utilized for coupling a plurality of hard disks which may be found in the data storage entities of FIG. 1a, FIG. 1b, FIG. 1c and FIG. 2.

With reference to FIG. 3, in normal operation, the device may have the receiver Rx(n−1) coupled to the transmitter Tx(n) and the receiver Rx(n) may be coupled to the transmitter Tx(n+1) where n=0, 1, 2, . . . , 7 and when n=7, (n+1)=0. The arrows indicate a path which data travels as it traverses the loop or ring. Accordingly, data may traverse port Tx(n−1) to Rx(n−1) to Tx(n) to Rx(n) to Tx(n+1) to Rx(n+1) and so on.

Figure 15:
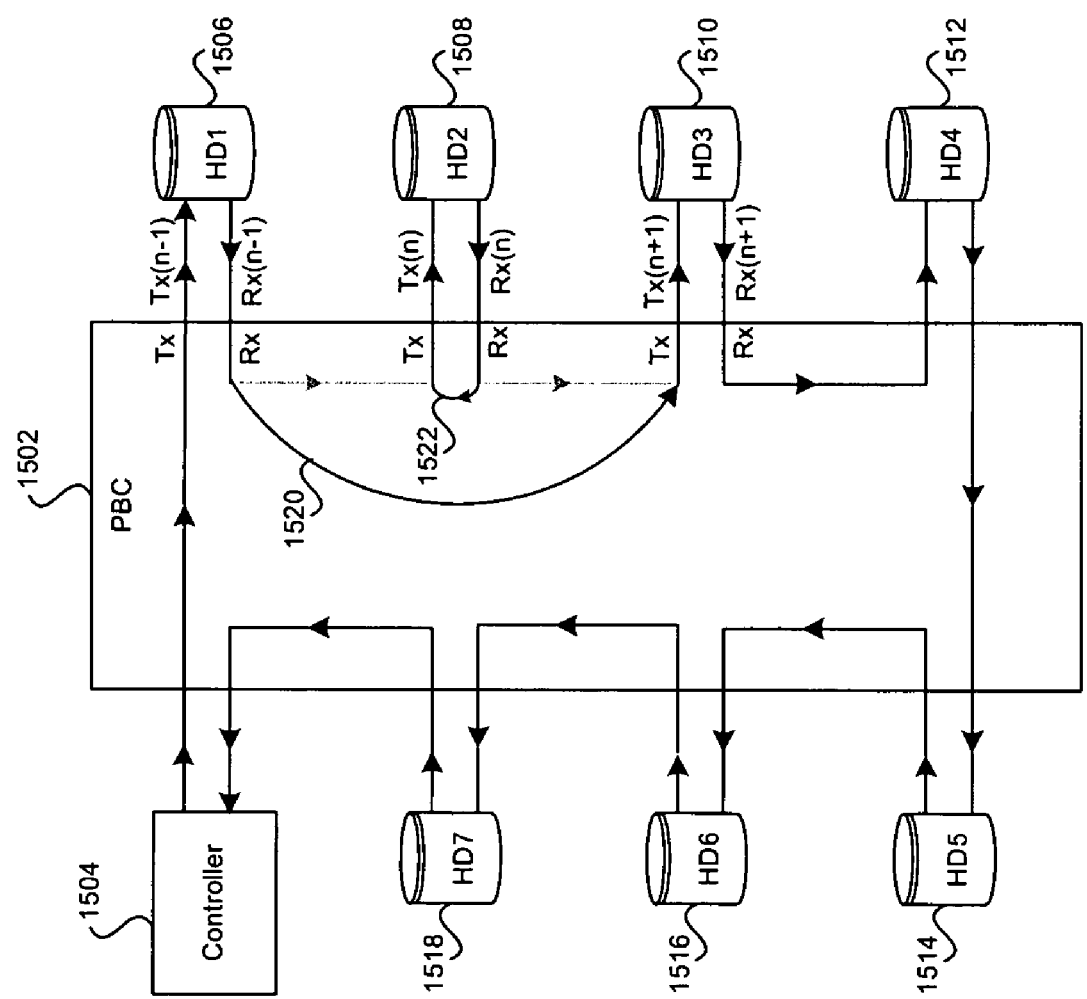
FIG. 15 is a block diagram of an exemplary port bypass controller system configured to bypass port n that may be utilized in connection with LIPf7 origination detection and LIPf8 suppression in a port bypass controller, in accordance with an embodiment of the invention.

FIG. 15 is a block diagram of an exemplary port bypass controller system configured to bypass port n that may be utilized in connection with LIPf7 origination detection and LIPf8 suppression in a port bypass controller, in accordance with an embodiment of the invention. Referring to FIG. 15, there is shown a port bypass controller (PBC) 1402, a controller 1504 and a plurality of hard disks 1506, 1508, 1510, 1512, 1514, 1516, 1518. The port handling hard disk 1506 comprises transmit section Tx(n−1) and Rx(n−1). The port handling hard disk 1508 comprises transmit section Tx(n) and Rx(n). The port handling hard disk 1510 comprises transmit section Tx(n+1) and Rx(n+1).

When port bypass is executed for port (n), the port bypass controller 1502 may be configured to generate two paths in order to bypass port n. The first path 1520 may comprise coupling the output port Rx(n−1) to the transmit port (Tx(n+1). The second path 1522 may comprise cross connecting the transmit port Tx(n) and the receive port Rx(n) of the port bypass controller 1502. In this regard, a signal coming into the receiver path Rx(n−1) may be coupled to the path Tx(n+1) leaving the port bypass controller 1502, where n=0, 1, 2, . . . , 7 and when n=7, (n+1)=0. The signal coming in the receiver path Rx(n) may be coupled to or loopbacked to the Tx(n) where n=0, 1, 2, . . . , 7 and when n=7, (n+1)=0. Accordingly, the path 1522 may be referred to as a loopback path since the port Tx(n) and Rx(n) are cross connected. The connection 1520 and/or 1522 may be made in the port bypass controller 1502 via an internal digital logic section for the port bypass controller, for example. The loopback connection 1522 may be done in the FC-SERDES.

The loopback connection 1522 may provide an initial insertion loopback state for, for example, a new hard disk (HD) that is to be tested prior to being inserted in the arbitrated loop. The loopback 1522 may also provide device isolation in cases where a cascaded device topology is utilized. A reference clock may be appropriately set in the FC-SERDES after the data-path connections are completed.

The smooth unmanaged mode 1310 of FIG. 13 may be somewhat similar to the normal unmanaged mode 1308. However, for the smooth unmanaged mode 1, LIPf7 insertions are done. For the reference clock switches first operating mode 1316, the reference clock may be configured to switch right before the connections 1520, 1522 are made. In this regard, the port bypass controller 1502 may switch to the correct clock and then it injects, for example, (16) LIPf7s in the transmitter path Tx (n+1). After the sixteen (16) LIPf7s are inserted, the data-path connections may be completed. For the reference clock switches later operating mode 1318, the port bypass controller 1502 may continue to insert LIPf7s until it detects, for example, three (3) consecutive LIPf7s at the Rx(n−1). Accordingly, in the reference clock switches later operating mode, after receiving the return three (3) LIPf7s, the clock may be switched and the data/paths 1520, 1522 may be coupled.

In the managed port bypass mode 1306, the port bypass controller 1502 may automatically perform the port bypass based on one or more port or link failure conditions. In order to prevent port bypass whenever a particular link failure condition occurs, an interrupt corresponding to a particular condition may be masked. For example, a host processor or system may be utilized to mask a particular interrupt to prevent execution of an interrupt routine handler. Exemplary conditions that may cause a managed or automatic port bypass may comprise a LOSSYNC, LIPf8, RX_LOS, TX_FAULT and a bypass select. A loss of synchronization (LOSYNC) condition may be detected by the CDR and reported by the FC-SERDES. A LIPf8 condition may be reported when three consecutive LIPf8s are detected at the receive path, a loss of signal (RX_LOS) condition may be detected and reported when a signal cannot be detected in the receive path. A transmit failure or fault (TX_FAULT) condition may be detected and reported, for example, via a pin, by the device such as a hard disk which may be connected to the port. A bypass select condition may be detected and generated whenever a port is to be bypassed. In an aspect of the invention, the bypass select pin may be the same as the TX_FAULT pin. However, the invention is not so limited and different pins may be utilized.

Figure 16:
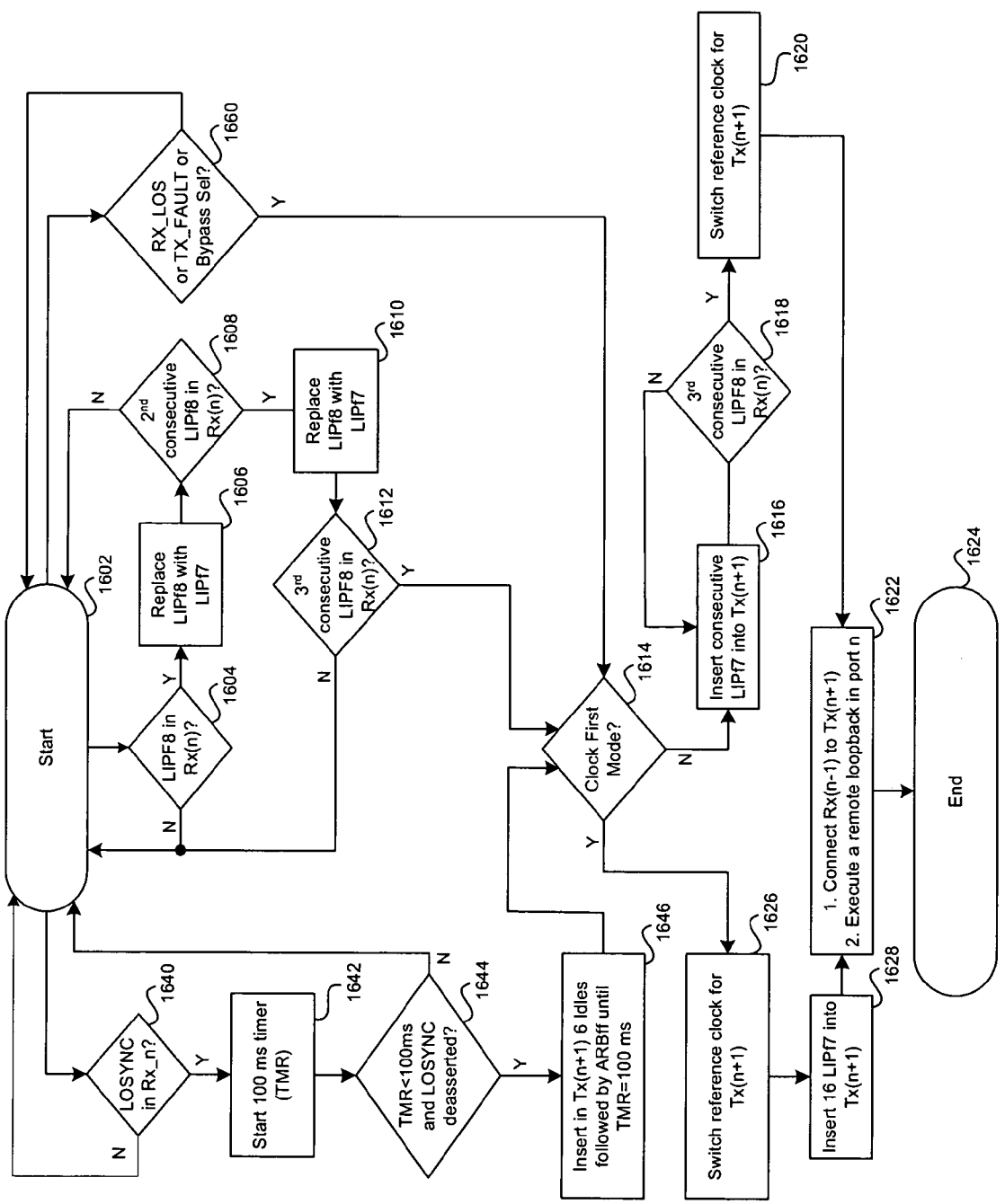
FIG. 16 is a flow chart illustrating LIPf7 origination detection and LIPf8 suppression and in a port bypass controller with reference to FIG. 15, in accordance with an embodiment of the invention.

FIG. 16 is a flow chart illustrating LIPf7 origination detection and LIPf8 suppression and in a port bypass controller with reference to FIG. 15, in accordance with an embodiment of the invention. FIG. 16 also illustrates a reference clock switches first mode of operation and a reference clock switches after mode of operation. Referring to FIG. 16, the exemplary steps start with step 1602. In step 1604, it may be determined whether a LIPf8 primitive is found in the port Rx(n). In no LIPf8 primitive is found, then control passes or loops back to the start step 1602. However, if a LIPf8 primitive is found in port Rx(n), then in step 1606, the LIPf8 primitive is replaced with LIPf7. In step 1608, it may be determined whether a second consecutive LIPf8 primitive is found in port Rx(n). If a second consecutive LIPf8 primitive is not found, then control passes or loops back to the start step 1602. However if a second consecutive LIPf8 primitive is found, then in step 1610, the second consecutive LIPf8 primitive is replaced with LIPf7. In step 1612, it may be determined whether a third consecutive LIPf8 is in port Rx(n). If a third consecutive LIPf8 is not in port Rx(n), then control passes or loops back to the start step 1602. However, if a third consecutive LIPf8 is in path Rx(n), then in step 1614, it may be determined whether the operating mode is a reference clock switches first operating mode.

In step 1614, if it is determined that the operating mode is a reference clock switches first operating mode, then in step 1626, the reference clock is switched to port Tx(n+1). In step 1628, a plurality of LIPf7s, for example, 16 LIPf7s may be infected or inserted into port Tx(n+1). In step 1622, port Rx(n−1) may be connected to port Tx(n+1) and a remote loopback may be executed for port n. Accordingly, port Rx(n) is cross connected to port Tx(n). The exemplary steps may then end at step 1624.

Returning to step 1614, if it is determined that the operating mode is not a reference clock switches first operating mode, then the reference clock switches after operating mode will be executed. Accordingly, in step 1616, consecutive LIPf7s may be inserted into port Tx(n+1). In step 1618, it may be determined whether there is a third consecutive LIPf8 in port Rx(n). If there is not a third consecutive LIPf8 in port Rx(n), then control passes or loops back to the start step 1616. In step 1618, if it is determined that there is a third consecutive LIPf8 in port Rx(n), then in step 1620, the reference clock may be switched for port Tx(n+1). Accordingly, in step 1622, port Rx(n−1) may be connected to port Tx(n+1) and a remote loopback may be executed for port n. The exemplary steps may then end at step 1624.

For a loss of synchronization (LOSYNC) condition, in step 1640, if no LOSYNCH occurs, then control passes back to the start step 1602. However, if a loss of synchronization condition occurs in port Rx(n), then in step 1642, a timer (TMR) may be started. The period timer may have a value of, for example, about 100 ms. In step 1644, it may be determined whether the timer value is less than 100 ms and a LOSYNC signal is deasserted. If the timer value is not less than 100 ms and a LOSYNC signal is not deasserted, then control passes back to the start step 1602. However, if the timer value is less than 100 ms and the LOSYNC signal is deasserted, then in step 1646, for example, about 6 idles followed by ARBff primitives are inserted or infected until the timer (TMR) value reaches 100 ms and expires. Control may then pass back to step 1614 where it may be determined whether the operating mode is a reference clock switches first operating mode or a reference clock switches later operating mode. If it is determined that the operating mode is a reference clock switches first operating mode, then steps 1626, 1628, 1622 and 1624 may be executed as previously described. However, if the operating mode is a reference clock switches later operating mode, then steps 1616, 1618, 1620, 1622 and 1624 may be executed as previously described.

For a receive loss of signal (LOS) condition, a transmit fault condition and/or a bypass select condition, in step 1660, a determination may be made as to whether one or more of these conditions occurred. If not, control passes back to the start step 1602. However, if a receive loss of signal (LOS) condition, a transmit fault condition or a bypass select condition occurs, then in step 1614, it may be determined whether the operating mode is a reference clock switches first operating mode or a reference clock switches later operating mode. If it is determined that the operating mode is a reference clock switches first operating mode, then steps 1626, 1628, 1622 and 1624 may be executed as previously described. However, if the operating mode is a reference clock switches later operating mode, then steps 1616, 1618, 1620, 1622 and 1624 may be executed as previously described.

For port auto-insertion, a processor such as a host processor or controller may be adapted to detect whether an inserted device such as a hard disk is operating properly and then proceed with inserting a port. During the insertion of the new port, no LIPf8 will be produced on the loop due to this switching action. However, once the hard disk is inserted, it may generate the initialization protocol by generating LIPf8 primitives. For auto port insertion, the processor may verify that none of the following conditions exist. For example, there are no fault conditions, no loss of signal condition and no loss of synchronization condition.

In one embodiment of the invention, x consecutive LIPf7 primitives may be monitored by using an active link integrity statistic monitoring function in the port bypass controller. The monitored port may also be checked to ensure that no LIPf8 primitives are being received. A particular port may be tested using the Active SI/Active LI capabilities of the port bypass controller, if applicable, prior to requesting an insertion. A processor such as a host processor or controller may also configure one or more register bits to insert the port for handling device such as a hard disk. Once the appropriate register bits are asserted, the inserted device is now fully coupled to the loop. The device may be inserted in any port independently of whether it is operating in retimer mode or repeater mode.

Port auto-removal may require the processor or controller to receive, for example, an interrupt and determine whether to remove a port. Once an interrupt that points to a link failure condition is received, a signal and link integrity information for the ports may be acquired by the processor or controller in order to determine which device is failing. Since the loop direction and retimer/repeater modes for each of the ports may be obtained by the processor, the failing device may be readily determined. For auto-removal, the device may need to have at least one active port in retimer mode. Whenever the device is part of a chain of cascading PBCs, each cascading connection may have at least one of the ports operating in retimer mode. The processor or controller may be configured to reinitialize the loop after the port has been removed. Furthermore, the processor or controller may utilize one of the ports in retimer/mode to temporarily insert a set of LIPf7 order sets to force the loop to reinitialize.

The processor or controller may be adapted to verify whether a link down condition exists by determining whether there is a fault condition, a loss of signal, and/or a CDR is out-of-lock, for example. The LIPf8 interrupt condition may not be directly used as part of the removal decision. However, the invention is not so limited. A LIPf8 received condition may be utilized to determine which port may likely be coupled to a failing device such as a hard disk. The processor or controller may set up one or more register bits to remove the failing or failed device and the port bypass controller (PBC) may remove the failed device from the loop by bypassing the port to which the failed device is coupled. The failed device may be removed from any port independently of whether it is operating in retimer mode or repeater mode.

For LIPf8 suppression and LIPf7 insertion, the port bypass controller may be adapted to suppress LIPf8 primitives received by ports operating in retimer mode and may replace these LIPf8 primitives with LIPf7 primitives. This functionality may be maskable. In addition, the host processor or controller may be adapted to request the generation of LIPf7 primitives from any port operating in retimer mode. The generation of LIPf7 primitives may be automatic. In this case, the chosen port may generate, for example, 16 LIPf7 primitives and may continue forwarding regular loop traffic. The switching into this generation of LIPf7 primitive mode may be done on a word-boundary. For manual generation of LIPf7 primitives, the chosen port may continuously generate LIPf7 until the host processor or controller sends a STOP command to end the generation function. After receiving the STOP command, the port may be adapted to resume forwarding regular loop traffic. The switching into this generation mode may be done on a word-boundary.

Autonomous port insertion/removal may comprise verifying that certain conditions exists. Exemplary conditions may comprise no loss of signal, no loss of synchronization, that the CDR is locked, that three (3) consecutive LIPf7 primitives have been detected and that the port is not forced into a bypass mode. If these conditions are satisfied, then the port bypass controller may insert the hard disk into the loop. One or more register bits may be utilized to determine if the autonomous insert is active and mask bits may be defined for each of these conditions. If the mask bits are asserted for a given condition, then the associated condition may be ignored for the insertion operation. The hard disk may be inserted in any port independent of whether the port in operating in retimer mode or repeater mode.

The autonomous port removal may also verify that certain conditions relating to a link down condition exist in the port bypass controller. Exemplary conditions may comprise a transmission fault condition, a receive loss of signal condition, a CDR is out-of-lock and a loss of Word Sync is detected for about 100 msec. A LIPf8 interrupt condition may not be directly utilized as part of the removal decision. However, the invention is not so limited. A LIPf8 received condition may be utilized to determine which port has a possibly failing device such as a hard disk. The port bypass controller may remove the device from the loop once it has been identified. One or more register bits may be utilized to determine whether autonomous port removal is active. Mask bits may be defined for each of the conditions, which when asserted for a given condition, causes the condition to be ignored for the removal operation. A device such as a hard disk may be removed from any port independently of whether it is operating in retimer or repeater mode.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for operating a port bypass controller, the method comprising:
   receiving a data stream at a receive port Rx(n) of a port bypass controller, where n is an integer indexing a port in said port bypass controller;
   suppressing LIPf8 primitives in said received data stream at said receive port Rx(n);
   inserting LIPf7 primitives in place of at least a portion of said suppressed LIPf8 primitives;
   determining an operating mode of said port Rx(n), if at least three (3) consecutive LIPf8 primitives are received at said receive port Rx(n); and
   inserting a plurality of IDLES in said received data stream if said operating mode of said port Rx(n) is a reference clock switched first mode.

2. The method according to claim 1, comprising inserting a plurality of ARBff primitives after said plurality of IDLES.

3. The method according to claim 1, comprising switching a reference clock for port Tx(n+1) if said operating mode of said port Rx(n) is a reference clock switched first mode.

4. The method according to claim 3, comprising inserting at least one LIPf7 primitive into said port Tx(n+1).

5. The method according claim 4, comprising:
   coupling port Rx(n−1) to said port Tx(n+1); and
   coupling said port Rx(n) to port Tx(n).

6. The method according to claim 1, comprising, if said operating mode of said port Rx(n) is a reference clock switched later mode, inserting consecutive LIPf7 primitives into port Tx(n+1).

7. The method according to claim 6, comprising, if at least three (3) consecutive LIPf8 primitives are received in port Rx(n), switching a reference clock for said port Tx(n+1).

8. The method according to claim 7, comprising:
   coupling port Rx(n−1) to said port Tx(n+1); and
   coupling said port Rx(n) to port Tx(n).

9. A machine-readable storage having stored thereon, a computer program having at least one code section for operating a port bypass controller, the at least one code section executable by a machine for causing the machine to perform steps comprising:
   receiving a data stream at a receive port Rx(n) of a port bypass controller, where n is an integer indexing a port in said port bypass controller;
   suppressing LIPf8 primitives in said received data stream at said receive port Rx(n);
   inserting LIPf7 primitives in place of at least a portion of said suppressed LIPf8 primitives;
   determining an operating mode of said port Rx(n), if at least three (3) consecutive LIPf8 primitives are received at said receive port Rx(n); and
   inserting a plurality of IDLES in said received data stream, if said operating mode of said port Rx(n) is a reference clock switched first mode.

10. The machine-readable storage according to claim 9, comprising code for inserting a plurality of ARBff primitives after said plurality of IDLES.

11. The machine-readable storage according to claim 9, comprising code for switching a reference clock for port Tx(n+1) if said operating mode of said port Rx(n) is a reference clock switched first mode.

12. The machine-readable storage according to claim 11, comprising code for inserting at least one LIPf7 primitive into said port Tx(n+1).

13. The machine-readable storage according claim 12, comprising:
   code for coupling port Rx(n−1) to said port Tx(n+1); and
   code for coupling said port Rx(n) to port Tx(n).

14. The machine-readable storage according to claim 9, comprising code for inserting consecutive LIPf7 primitives into port Tx(n+1), if said operating mode of said port Rx(n) is a reference clock switched later mode.

15. The machine-readable storage according to claim 14, comprising code for switching a reference clock for said port Tx(n+1), if at least three (3) consecutive LIPf8 primitives are received in port Rx(n).

16. The machine-readable storage according to claim 15, comprising:
- code for coupling port Rx(n−1) to said port Tx(n+1); and
- code for coupling said port Rx(n) to port Tx(n).

17. A system for operating a port bypass controller, the system comprising:
- a receive port Rx(n) of a port bypass controller that receives a data stream, where n is an integer indexing a port in said port bypass controller;
- at least one processor that suppresses LIPf8 primitives in said received data stream at said receive port Rx(n);
- said at least one processor inserts LIPf7 primitives in place of at least a portion of said suppressed LIPf8 primitives;
- wherein said at least one processor determines an operating mode of said port Rx(n), if at least three (3) consecutive LIPf8 primitives are received at said receive port Rx(n); and
- said at least one processor inserts a plurality of IDLES in said received data stream, if said operating mode of said port Rx(n) is a reference clock switched first mode.

18. The system according to claim 17, wherein said at least one processor inserts a plurality of ARBff primitives after said plurality of IDLES.

19. The system according to claim 17, wherein said at least one processor switches a reference clock for port Tx(n+1), if said operating mode of said port Rx(n) is a reference clock switched first mode.

20. The system according to claim 19, wherein said at least one processor inserts at least one LIPf7 primitive into said port Tx(n+1).

21. The system according claim 20, wherein:
- said at least one processor couples port Rx(n−1) to said port Tx(n+1); and
- said at least one processor couples said port Rx(n) to port Tx(n).

22. The system according to claim 17, wherein said at least one processor inserts consecutive LIPf7 primitives into port Tx(n+1), if said operating mode of said port Rx(n) is a reference clock switched later mode.

23. The system according to claim 22, wherein said at least one processor switches a reference clock for said port Tx(n+1), if at least three (3) consecutive LIPf8 primitives are received in port Rx(n).

24. The system according to claim 23, wherein:
- said at least one processor couples port Rx(n−1) to said port Tx(n+1); and
- said at least one processor couples said port Rx(n) to port Tx(n).

* * * * *